United States Patent
Chosa et al.

(10) Patent No.: US 7,911,510 B2
(45) Date of Patent: Mar. 22, 2011

(54) IMAGING APPARATUS USING A KEY IMAGE IN IMAGE RETRIEVAL OR READING OUT

(75) Inventors: Takashi Chosa, Kurume (JP); Yuya Ota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 957 days.

(21) Appl. No.: 10/576,212

(22) PCT Filed: Jun. 7, 2005

(86) PCT No.: PCT/JP2005/010754
§ 371 (c)(1),
(2), (4) Date: Apr. 17, 2006

(87) PCT Pub. No.: WO2005/122564
PCT Pub. Date: Dec. 22, 2005

(65) Prior Publication Data
US 2008/0144976 A1    Jun. 19, 2008

(30) Foreign Application Priority Data

Jun. 10, 2004   (JP) ................................ 2004-173010
Jun. 10, 2004   (JP) ................................ 2004-173013

(51) Int. Cl.
H04N 5/222   (2006.01)
H04N 5/232   (2006.01)
(52) U.S. Cl. .............. 348/231.99; 348/231.2; 348/231.3
(58) Field of Classification Search ............... 348/231.2, 348/333.01, 333.11, 231.99, 231.3, 231.5
See application file for complete search history.

(56) References Cited

U.S. PATENT DOCUMENTS

| 5,644,765 | A | 7/1997 | Shimura et al. |
| 6,229,566 | B1* | 5/2001 | Matsumoto et al. ........ 348/231.2 |
| 6,674,472 | B1 | 1/2004 | Tsutsui |
| 6,704,047 | B1 | 3/2004 | Tsutsui ..................... 348/231.7 |
| 6,738,093 | B1 | 5/2004 | Kitagawa et al. ........ 348/231.99 |
| 6,816,633 | B1 | 11/2004 | Kusama et al. |
| 6,977,679 | B2* | 12/2005 | Tretter et al. .............. 348/231.2 |
| 2001/0012064 | A1* | 8/2001 | Kubo ............................ 348/231 |
| 2001/0030692 | A1 | 10/2001 | Yoneda ........................ 348/207 |
| 2001/0032070 | A1* | 10/2001 | Teicher ............................ 704/2 |
| 2001/0041056 | A1* | 11/2001 | Tanaka et al. ................... 386/95 |
| 2002/0180873 | A1* | 12/2002 | Misawa ..................... 348/231.6 |
| 2003/0011683 | A1* | 1/2003 | Yamasaki et al. ........... 348/207.1 |
| 2003/0063304 | A1* | 4/2003 | Satomi et al. ................ 358/1.11 |

(Continued)

FOREIGN PATENT DOCUMENTS

JP    7-111628    4/1995

(Continued)

OTHER PUBLICATIONS

Sep. 30, 2005 International Search Report in PCT/JP2005/010754.

(Continued)

*Primary Examiner* — David L Ometz
*Assistant Examiner* — Dwight Alex C Tejano
(74) *Attorney, Agent, or Firm* — Fitzpatrick, Cella, Harper & Scinto

(57) ABSTRACT

An imaging apparatus includes an operating unit that is capable of inputting a first operation input in acquiring generic image data and a second operation input in acquiring key image data in different operation forms. In addition, the imaging apparatus stores the generic image data and the key image data in an identical storage medium in expressions distinguishable from each other.

12 Claims, 30 Drawing Sheets

U.S. PATENT DOCUMENTS

| | | | |
|---|---|---|---|
| 2003/0174219 A1* | 9/2003 | Iijima | 348/231.99 |
| 2004/0012693 A1 | 1/2004 | Hayashi | 348/231.2 |
| 2004/0062525 A1 | 4/2004 | Hasegawa et al. | 386/69 |
| 2004/0201692 A1* | 10/2004 | Parulski et al. | 348/207.1 |
| 2004/0263661 A1* | 12/2004 | Okisu et al. | 348/333.02 |
| 2005/0110878 A1* | 5/2005 | Dalton | 348/231.2 |
| 2005/0162523 A1* | 7/2005 | Darrell et al. | 348/211.2 |
| 2005/0254099 A1* | 11/2005 | Yoda et al. | 358/403 |

FOREIGN PATENT DOCUMENTS

| | | |
|---|---|---|
| JP | 7-160731 | 6/1995 |
| JP | 11-261944 | 9/1999 |
| JP | 11-317930 | 11/1999 |
| JP | 2000-76302 | 3/2000 |
| JP | 2000-187670 | 7/2000 |
| JP | 2000-276484 | 10/2000 |
| JP | 2000-311246 | 11/2000 |
| JP | 2001-52011 | 2/2001 |
| JP | 2001-298694 | 10/2001 |
| JP | 2004-72195 | 3/2004 |
| JP | 2004-96253 | 3/2004 |

OTHER PUBLICATIONS

Sep. 30, 2005 Written Opinion in PCT/JP2005/010754.

Japanese Office Action dated Aug. 10, 2009, in counterpart Japanese Application No. 2004-173013, and partial translation.

Japanese Office Action issued Oct. 23, 2009, in Japanese Patent Application No. 2004-173013.

Japanese Office Action dated Jan. 25, 2010, in Japanese Application No. 2004-173010, and English-language translation thereof.

* cited by examiner ing apparatus using a key image in image retrieval or reading out

TECHNICAL FIELD

The present invention relates to an imaging apparatus that captures an image of a subject (hereinafter referred to as subject image) and stores the subject image on a storage medium, and more particularly, to an imaging apparatus including an image retrieving function.

BACKGROUND ART

Conventionally, an imaging apparatus that captures a subject image and stores the subject image on a storage medium has been put to practical use. However, as the capacity of the storage medium increases, it has been demanded that the stored image can be retrieved easily.

In response to this demand, Japanese Patent Application Laid-Open No. 2000-76302 proposes an imaging apparatus that extracts a characteristic amount of image data stored on a storage medium and a characteristic amount of key image data and compares both the characteristic amounts to retrieve desired image data.

There has also been proposed a method of making it easy to visually understand the similarity of images (Japanese Patent Application Laid-Open No. 2000-311246). In the invention described in the reference, in displaying similar images, a characteristic amount is extracted from image data of respective images, a characteristic amount space is divided hierarchically on the basis of the extracted characteristic amount, a tree structure is formed, and a display space is formed on the basis of the tree structure.

DISCLOSURE OF INVENTION

However, the image retrieving unit disclosed in the reference does not sufficiently take into account the convenience for users in terms of imaging and setting of a key image, a management method for the key image, and the like. Therefore, there is plenty of room left for improvement in the image retrieving unit.

For example, it would be preferable for a user if the operation for capturing generic image data and the operation for capturing key image data can be distinguished clearly without causing a deterioration in the consistency of operation of the unit.

Incidentally, in an imaging apparatus that captures generic image data and key image data without distinction and stores these image data on a storage medium, if a large number of image data are stored on the storage medium, a user has trouble in selecting the key image data. In particular, in the future, it is expected that the capacity of the storage medium will increase rapidly and the amount of image data stored on the storage medium will be enormous. Thus, the work for finding the key image data will be more difficult than in the past.

Therefore, the work of setting the key image data in an image retrieving phase to be performed later would be easier if the generic image data and the key image data are distinguished and stored from the beginning in the phase of imaging.

In order to solve the problems, the invention provides an imaging apparatus that images a subject image and stores the subject image on a storage medium, wherein the imaging apparatus images an generic image and a key image selectively. The invention provides an imaging apparatus that images a subject image and stores the subject image on a storage medium, wherein the imaging apparatus starts a retrieving operation using a key image with imaging of the key image as a trigger. The invention provides an imaging apparatus that images a subject image and stores the subject image on a storage medium, wherein the imaging apparatus stores a generic image on the storage medium and stores a key image on the identical storage medium. The invention provides an imaging apparatus that images a subject image and stores the subject image on a storage medium, wherein an image to be stored on the storage medium is a generic image and can also be used as a key image. The invention provides an imaging apparatus that images a subject image and stores the subject image on a storage medium, wherein the imaging apparatus specifies an arbitrary image in the storage medium and reads out and uses the arbitrary image as a key image. The invention provides an imaging apparatus that images a subject image and stores the subject image on a storage medium, wherein an image specified as key information or an image appearing from a retrieval result is designated and a retrieval button is pressed to execute retrieval again with the image as a key image.

The invention provides an imaging apparatus that images a subject image and stores the subject image on a storage medium, wherein an imaging operation for an image and a reproducing operation for an image is possible even during an image retrieval operation. The invention provides an imaging apparatus that images a subject image and stores the subject image in a storage medium, wherein, when the imaging apparatus operates in modes other than an imaging mode, the imaging apparatus is always in a state in which an arbitrary retrieval key is selected as a retrieval key. The invention provides an imaging apparatus that images a subject image and stores the subject image on a storage medium, wherein, when the imaging apparatus selects a key image as a retrieval key and displays images in an order of time or an order of file names. Programs of the respective inventions described above are operated in the imaging apparatus. The invention provides an imaging apparatus that images a subject image and stores the subject image on a storage medium, wherein the imaging apparatus images generic image data and key image data selectively. The imaging apparatus includes an operating unit that performs a first operation input in acquiring the generic image data and a second operation input in acquiring the key image data in different operation forms.

The invention provides an imaging apparatus that images a subject image and stores the subject image on a storage medium, including: an imaging unit that performs imaging processing for key image data that is used as a retrieval key; and a retrieving unit that retrieves generic image data, which has a predetermined relation with the key image data, out of generic image data stored on the storage medium, wherein the retrieving unit executes retrieval processing using the key image data with completion of the imaging processing for the key image data by the imaging unit as a trigger. The invention provides an imaging apparatus that images a subject image and stores the subject image on a storage medium, wherein the storage medium is a detachably replaceable storage medium and, when the storage medium stores image data stored in other apparatuses, the imaging apparatus further includes a selecting unit that selects at least one of the image data stored on the storage medium as key image data. The invention provides an imaging apparatus that images a subject image and stores the subject image on a storage medium, including: a retrieving unit that retrieves generic image data, which has a predetermined relation with key image data, out of generic image data stored on the storage medium; and a selecting unit that selects the generic image data retrieved by the retrieving unit as new key image data, wherein the retrieving unit executes retrieval processing again on the basis of the new key image data.

The invention provides an imaging apparatus that images a subject image and stores the subject image on a storage medium, including: an imaging unit that images generic image data to be retrieved; and a retrieving unit that retrieves generic image data, which has a predetermined relation with key image data, out of generic image data stored on the storage medium, wherein access to the storage medium by the imaging unit and access to the storage medium by the retrieving unit are executed by different controls such that, even when retrieval processing is executed in the retrieving unit, the imaging unit can image the generic imaging data in parallel with the retrieval processing.

The invention provides an imaging apparatus that images a subject image and stores the subject image on a storage medium, including: a retrieving unit that retrieves generic image data, which has a predetermined relation with key image data, out of generic image data stored on the storage medium; and a reproduction processing unit that reproduces the generic image data stored on the storage medium, wherein access to the storage medium by the reproduction processing unit and access to the storage medium by the retrieving unit are executed by different controls such that, even when retrieval processing is executed in the retrieving unit, the reproduction processing unit can reproduce the generic image data in parallel with the retrieval processing.

The invention provides an imaging apparatus that images a subject image and stores the subject image in a storage medium, including: an operation mode setting unit that sets an operation mode of the imaging apparatus; and a retrieving unit that retrieves generic image data, which has a predetermined relation with key image data, out of generic image data stored on the storage medium, wherein, when the imaging apparatus is set in an operation mode, in which retrieval processing is executable by the retrieving unit, the retrieving unit maintains the key image data designated in advance as a retrieval key.

The invention provides an imaging apparatus including: an imaging unit that images an image of a subject to acquire generic image data to be retrieved and key image data that is used as a retrieval key; a storage medium that stores the imaged generic image data; and a retrieving unit that retrieves generic image data, which has a predetermined relation with the key image data, out of the generic image data stored on the storage medium, wherein the imaging apparatus further includes a storage control unit that stores the key image data imaged by the imaging unit in the storage medium in an expression distinguishable from the general image data.

The invention provides an imaging unit that images an image of a subject to acquire generic image data to be retrieved and key image data that is used as a retrieval key; an image storage medium that stores the imaged generic image data; a retrieving unit that retrieves generic image data, which has a predetermined relation with the key image data, out of the generic image data stored in the image storage medium; and an operating unit for inputting an operation input, wherein, when a first operation input in acquiring the generic image data is inputted from the operating unit, the imaging apparatus controls the imaging unit to acquire the generic image data and store the generic image data on the storage medium and, when a second operation input for acquiring the key image data inputted in an operation expression form different from the first operation input is inputted from the operating unit, the imaging apparatus controls the imaging unit to acquire the key image data.

The invention provides an imaging apparatus including: an imaging unit that images an image of a subject to acquire generic image data to be retrieved and key image data that is used as a retrieval key; an image storage medium that stores the imaged generic image data; a retrieving unit that retrieves generic image data, which has a predetermined relation with the key image data, out of the generic image data stored on the image storage medium; and an operating unit for inputting an operation input, wherein the imaging apparatus stores the key image data imaged by the imaging unit on the storage medium in an expression distinguishable from the generic image data.

As explained above, according to the invention, it is possible to provide an imaging apparatus that can distinguish two kinds of imaging operations from each other clearly. According to the invention, it is possible to provide an imaging apparatus that can start retrieval simultaneously with imaging. According to the invention, it is possible to provide an imaging apparatus that can distinguish a generic image from a key image easily, can use the key image repeatedly, and can extract a key image suitable for the storage medium promptly. It is possible to provide an imaging apparatus that, even when a key image is not distinguished in a storage medium, for example, when a storage medium storing images imaged by other imaging apparatuses is used in the imaging apparatus, can specify a key image easily.

It is possible to provide an imaging apparatus that can perform retrieval easily because, even if a retrieval operation is started in an image slightly distant from a desired key image, it becomes more likely that an image close to the desired key image appears while retrieval is repeated. It is possible to provide an imaging apparatus that can execute an imaging operation and a reproducing operation appropriately even when a retrieval operation continues in the background. It is possible to provide an imaging apparatus that allows a user to start retrieval with a touch of a retrieval button in a reproduction mode. It is possible to provide an imaging apparatus that makes it easy to find a key image. According to the invention, the imaging apparatus includes the operating unit that inputs a first operation input in acquiring generic image data and a second operation input in acquiring key image data in different operation forms. Thus, the user can distinguish two kinds of imaging operations from each other clearly and select an image operation easily.

According to this invention, in the imaging apparatus that stores generic image data and key image data on an identical storage medium, the imaging apparatus stores the generic image data and the key image data on the storage medium in distinguishable expressions. Thus, it is possible to select key image data more easily and promptly than in the past. According to the invention, the imaging apparatus executes retrieval processing using key image data with completion of imaging processing for the key image data by the imaging unit as a trigger. Thus, the imaging apparatus can start retrieval after imaging a key image. According to the invention, the imaging apparatus can use images imaged by other imaging apparatuses as key image data. According to the invention, the imaging apparatus executes retrieval processing again on the basis of new key image data. Thus, it is possible to execute narrow-down retrieval and new retrieval with a simple operation.

According to the invention, access to a storage medium by the imaging unit and access to the storage medium by the retrieving apparatus are executed by different controls. Thus, even when retrieval processing is executed, the imaging unit can image generic image data in parallel with the retrieval processing. According to the invention, access to a storage medium by the reproduction processing unit and access to the storage medium by the retrieving unit are executed by different controls. Thus, even when retrieval processing is executed, it is possible to reproduce generic image data in parallel with the retrieval processing. According to the invention, when the retrieval processing is set in an operation mode, in which retrieval processing is executable, the key image data designated in advance is maintained as a retrieval key. Thus, it is possible to start retrieval with simple operation.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

In respective embodiments of the invention described below, an imaging apparatus having an image retrieval function is mainly kept in mind. In image retrieval, when a certain image is assumed to be a key image, other images related to this key image are extracted. As detailed methods for the image retrieval, other than the method of comparing images disclosed in the conventional technique and the like, there are techniques for comparing file names, acquisition times, comment information, and the like. Note that it is needless to mention that the invention does not depend on an image retrieval method and various image retrieval methods can be adopted.

First Embodiment

Figure 1:
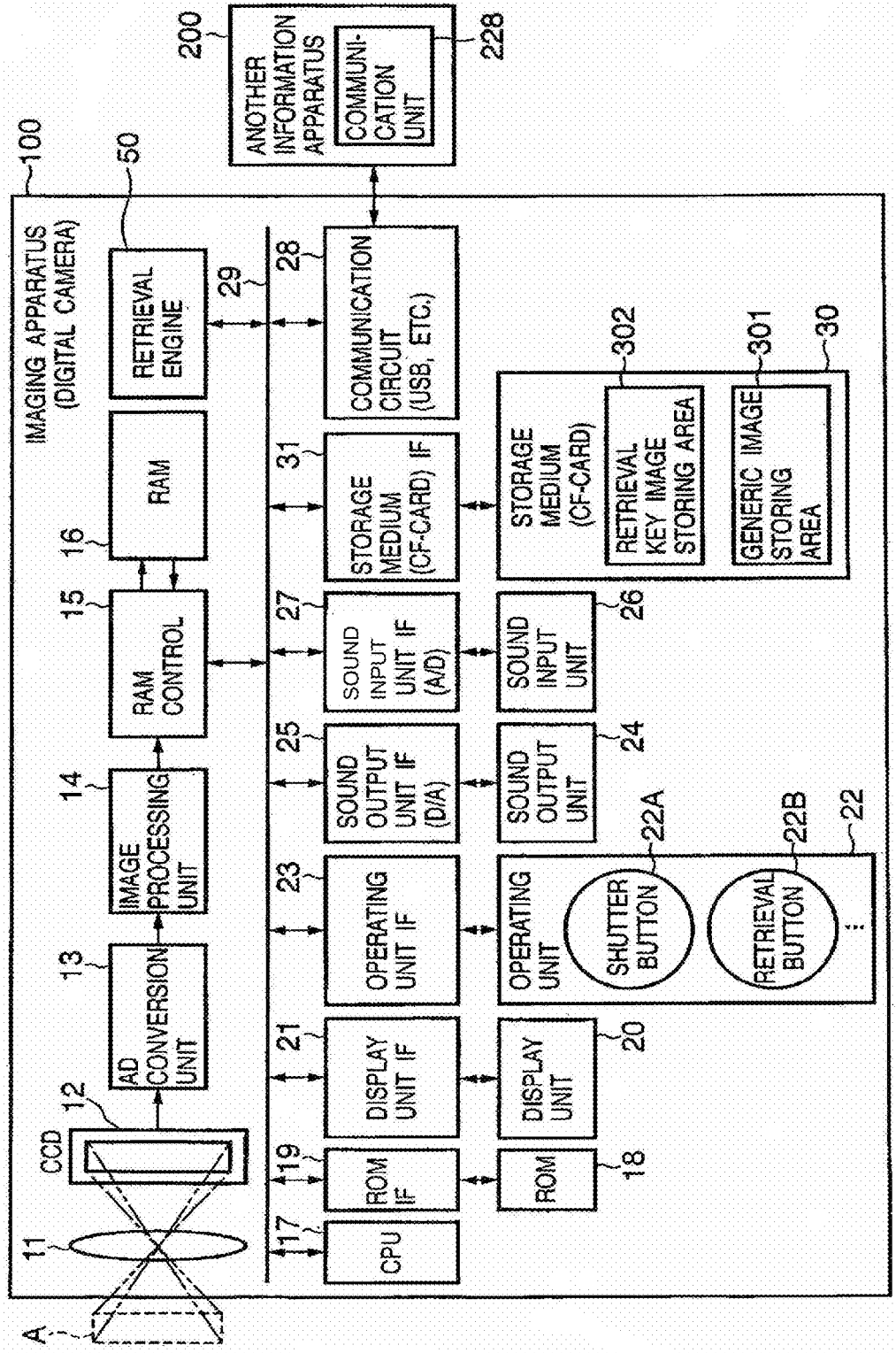
FIG. 1 is a block diagram showing an example of a structure of an imaging apparatus according to a first embodiment of the invention.
Figure 2:
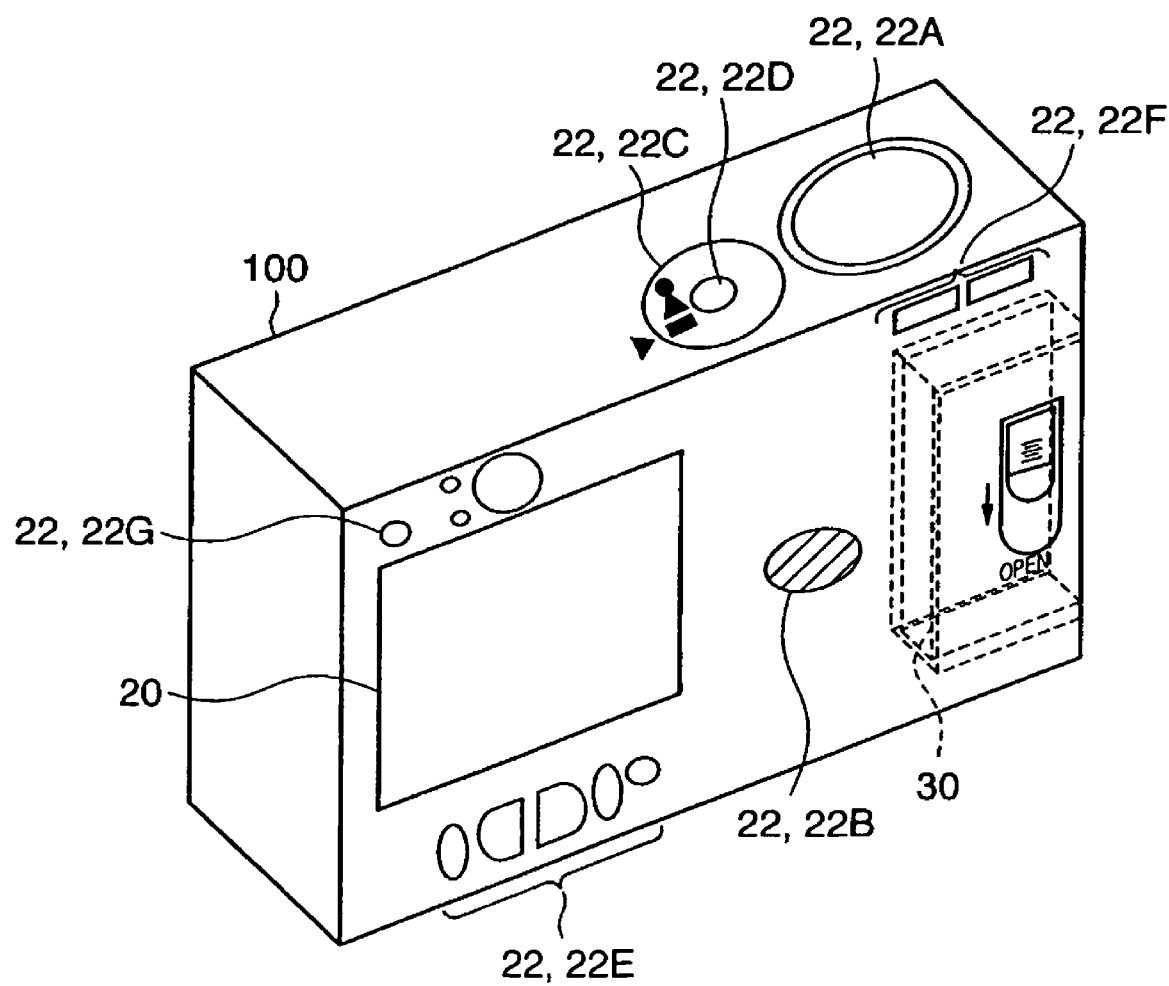
FIG. 2 is an external view of the imaging apparatus according to the first embodiment.

FIG. 1 is a block diagram showing an example of a structure of an imaging apparatus according to a first embodiment of the invention. It is possible to connect another information apparatus 200 such as a PC or a printer to an imaging apparatus 100 in this example. FIG. 2 is an external view of the imaging apparatus according to the first embodiment.

In FIGS. 1 and 2, reference numeral 100 denotes an imaging apparatus such as a digital camera, a digital video camera, a cellular phone with a camera, or a PDA with a camera. The imaging apparatus 100 can store a still image and a moving image as electronic data. The imaging apparatus 100 includes a shutter button 22A, a retrieval button 22B, a jog dial for mode setting 22C, a power switch 22D, display and file operation related buttons 22E, ZOOM & WIDE buttons 22F, and a DISP button 22G. These buttons form an operating unit 22.

A display unit 20 is formed by a liquid crystal display or the like. The display unit 20 displays a subject image, an image that has already been imaged, a key image in performing retrieval processing and a retrieval result, an operation guide for a user, and the like. A storage medium housing section, which is covered by a cap at the time of imaging, is provided on a side of the imaging apparatus 100. A storage medium 30 is inserted in the storage medium housing section. As examples of the storage medium 30, there are a repeatedly readable and writable memory card such as a COMPACT-FLASH® card (a CF card), a magnetic storage medium, an optical storage medium, a magneto-optical storage medium, and the like.

On the other hand, concerning an internal structure of the imaging apparatus 100, reference sign A in FIG. 1 denotes a subject image, reference numeral 11 denotes an optical system such as a lens, reference numeral 12 denotes a CCD (or a CMOS area sensor, etc.) serving as an imaging element, and reference numeral 13 denotes an AD conversion unit. Reference numeral 14 denotes an image processing unit that applies signal processing and the like to RGB signals adapted to human sight. For example, the image processing unit 14 applies a shading correction, a gamma conversion, and the like to a digital image input signal inputted through the AD conversion unit 13. Reference numeral 15 denotes a RAM controller, which is connected to a main CPU bus 29 and is also connected to a RAM 16 serving as storing means.

Reference numeral 17 denotes a (main) CPU that controls the entire imaging apparatus 100. Reference numeral 18 denotes a ROM that stores a program in which a control method and the like for the entire imaging apparatus are written. Reference numeral 19 denotes a ROMIF that plays a role of an interface between the ROM 18 and a main CPU bus 29. Reference numeral 24 denotes a sound output unit such as a speaker or a buzzer. Reference numeral 25 denotes a sound output unit IF including a DA converter. Reference numeral 26 denotes a sound input unit such as a microphone. Reference numeral 27 denotes a sound input unit IF including an AD converter.

Reference numeral 28 denotes a communication circuit serving as communicating means that should perform a function of communication with other information apparatus and the like. The communication circuit 28 executes operations complying with standards such as USB, LAN, wireless LAN, IrDA, Bluetooth, and IEEE1394. The communication circuit 28 communicates with the information apparatus 200, such as a PC or a printer, via a communication unit 228 mounted on the information apparatus 200. Consequently, it is possible to transfer image data or the like imaged by the imaging apparatus 100 to a PC and store the image data or the like in a PC or directly print the image data or the like with a printer or the like. It is also possible to remotely operate the imaging apparatus 100 from the information apparatus 200.

The display unit 20 is connected to the main CPU bus 29 via a display unit IF 21. It is possible to drive the display unit 20 from the (main) CPU 17. Similarly, the operating unit 22, including the shutter button 22A, the retrieval button 22B, the jog dial for mode setting 22C, the power switch 22D, the display and file operation related buttons 22E, the ZOOM & WIDE buttons 22F, and the DISP button 22G, is connected to the main CPU bus 29 via an operating unit IF 23. As a result, the imaging apparatus 100 recognizes an instruction, which is inputted from the operating unit 22, through the operating unit IF 23.

As shown in FIG. 1, the storage medium 30 is connected to the main CPU bus 29 via a storage medium IF 31. It is also possible to divide an internal area of the storage medium 30 into two areas, namely, a generic image storing area 301 and a key image storing area 302. Note that various kinds of means for dividing the internal area into two are possible. For example, the internal area may be divided by creating separate folders (directories) in an initial sequence or the like of the imaging apparatus or may be divided such that the respective areas can be accessed according to an address area.

A retrieval engine 50 is a circuit that compares key image data and generic image data and retrieves similar image data. The retrieval engine 50 may be formed by an ASIC or the like having a direct memory access (DMA) function. It is also possible to form the retrieval engine 50 with a sub-CPU that is capable of operating in parallel with the CPU 17.

(Operation in an Imaging Mode)

Figure 3:
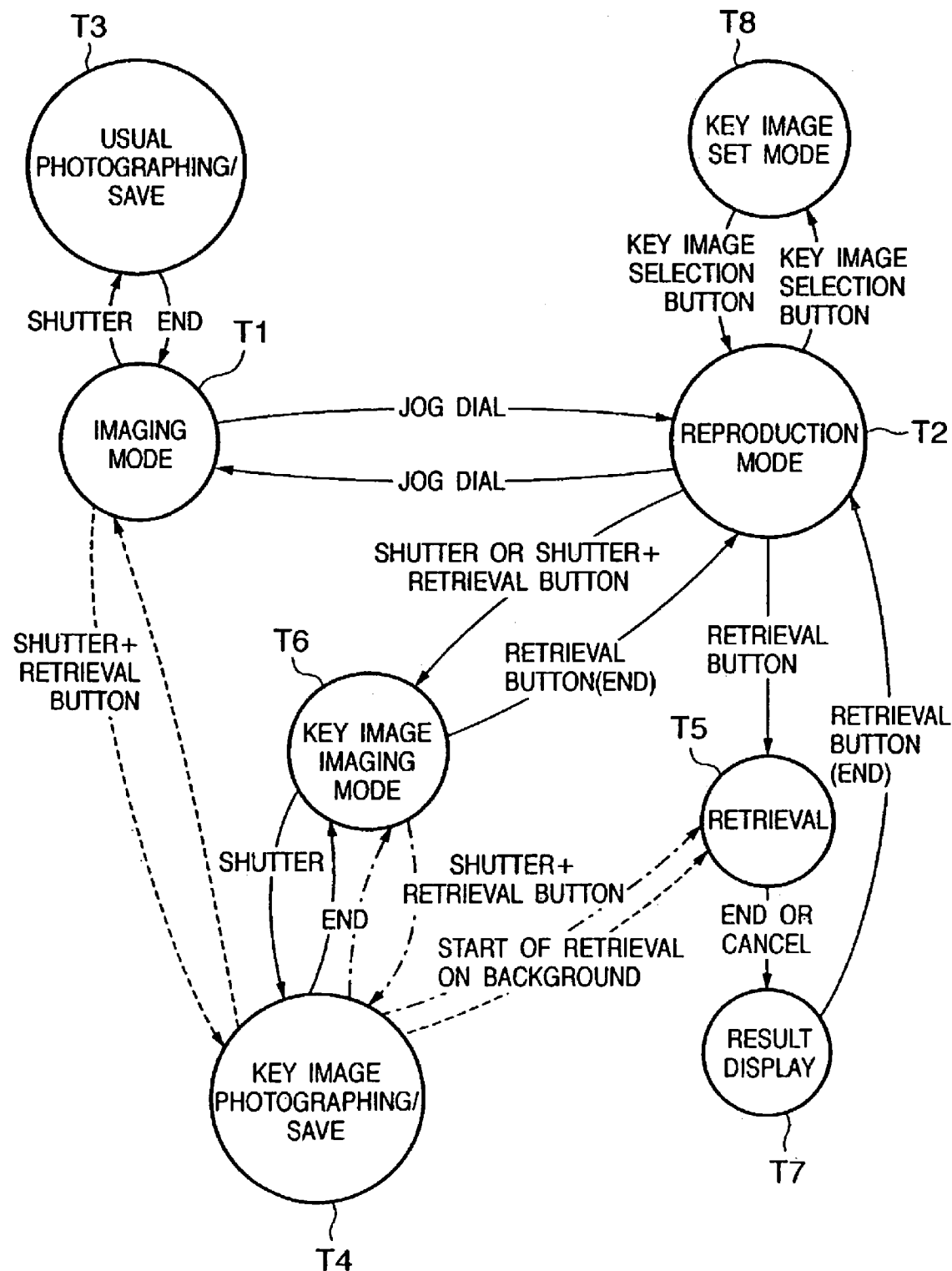
FIG. 3 is a state transition diagram showing a mode transition of the imaging apparatus according to the first embodiment.
Figure 4:
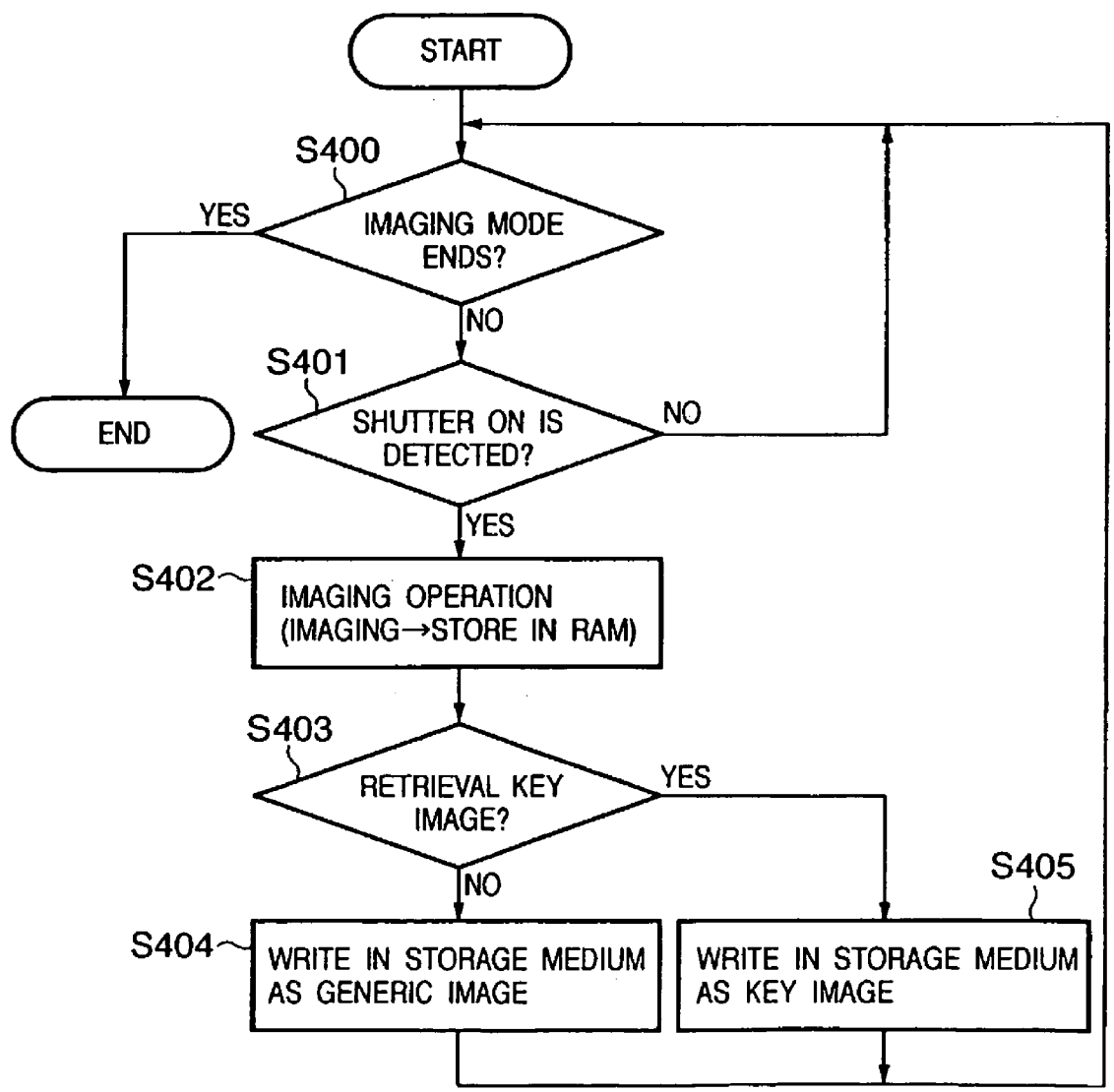
FIG. 4 is a flowchart showing an imaging operation and operations related to writing in a storage medium 30 according to the first embodiment.
Figure 5:
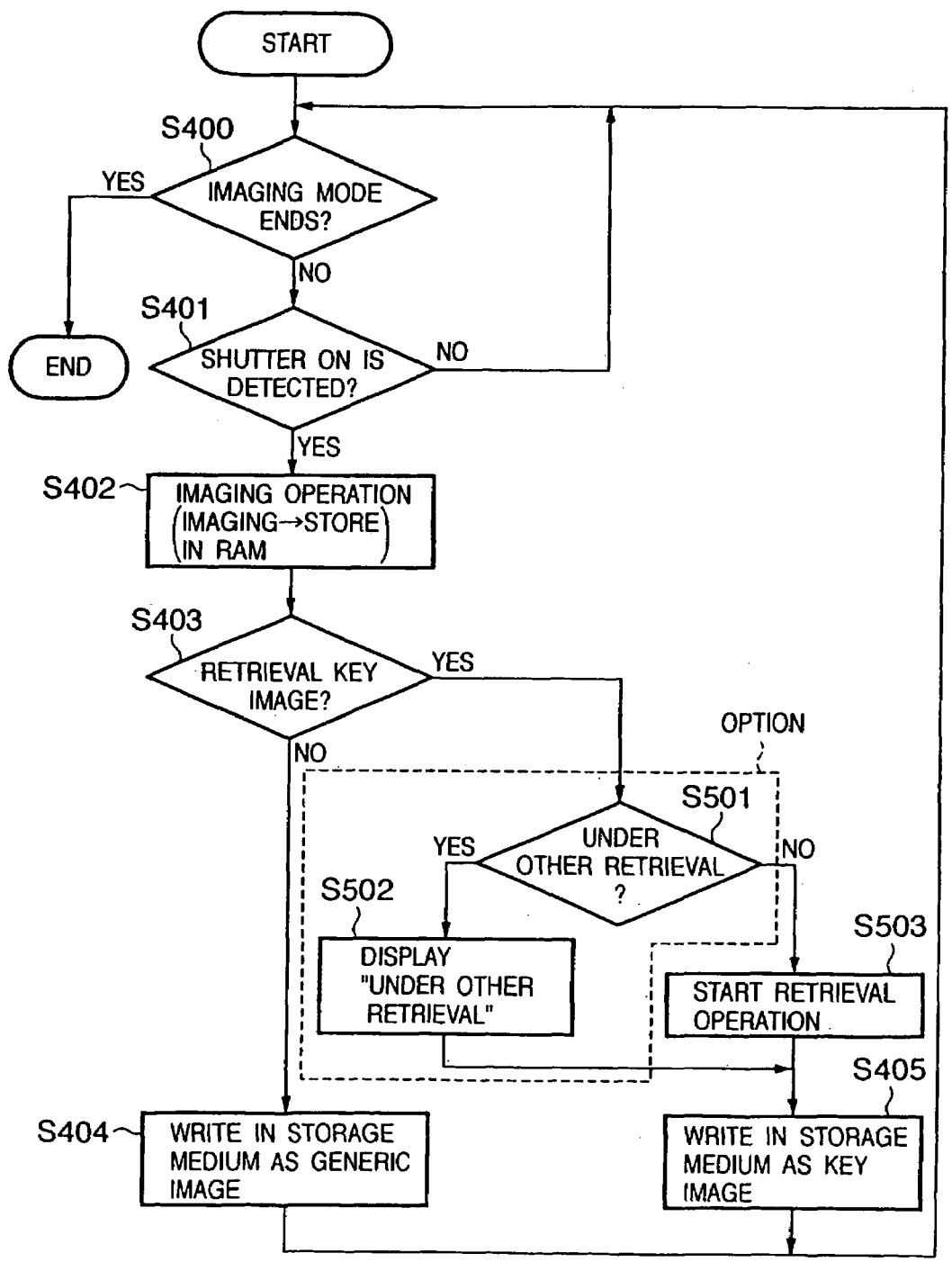
FIG. 5 is a flowchart showing an imaging operation, retrieval processing, and the like according to the first embodiment.

FIG. 3 is a state transition diagram showing a mode transition of the imaging apparatus according to the first embodiment. FIG. 4 is a flowchart showing an imaging operation, processing for writing in the storage medium 30, and the like according to the first embodiment. FIG. 5 is a flowchart showing an imaging operation, retrieval processing, and the like according to the first embodiment. First, an operation in an imaging mode will be explained with reference to these drawings.

It is assumed that the jog dial for mode setting 22C is set in the imaging mode and the power switch 22D is pressed to turn ON a power supply. In this case, after the power supply is turned ON, when considerable time elapses and the initial sequence or the like ends, the imaging apparatus 100 transitions to a state of the imaging mode (T1) referred to in FIG. 3 and comes into a standby state.

When the shutter button 22A is pressed in the imaging apparatus 100 that is in the imaging mode (T1) and the standby state, usual imaging processing is executed. In other words, a subject image is imaged by the imaging unit and stored in the storage medium 30 as a generic image. On the other hand, in this embodiment, it is possible to image and store a key image in this state. For example, when the shutter button 22A and the retrieval button 22B are pressed simultaneously, the imaging apparatus 100 can image and store a key image. By adopting such a constitution, it is possible to distinguish imaging of a generic image from imaging of a key image easily in the imaging mode.

In step S400, the CPU 17 polls a state of the jog dial 22C of the operating unit IF 23 to determine whether the imaging mode has ended. If the imaging mode has ended, the CPU 17 ends the processing in this flowchart. On the other hand, if the imaging mode continues, the CPU 17 proceeds to step S401. In step S401, the CPU 17 determines whether at least the shutter button 22A is pressed. For example, when the shutter button 22A is pressed, a shutter button ON signal is generated in the operating unit IF 23. Thus, the CPU 17 can detect the ON signal by executing polling. On the other hand, when the shutter button 22A and the retrieval button 22B are pressed simultaneously, a key image imaging signal (a simultaneous button press signal) is generated in the operating unit IF 23 in addition to the shutter button ON signal. The generated shutter button ON signal is communicated to the (main) CPU 17 in both imaging of a generic image and imaging of a key image. Note that, in detecting the shutter button ON signal, the shutter button ON signal may be detected by interrupt processing instead of the polling operation. If the shutter button ON signal cannot be detected, the CPU 17 returns to step S400. On the other hand if the shutter button ON signal is detected, the CPU 17 proceeds to step S402.

In step S402, the CPU 17 starts an imaging operation. Specifically, the CPU 17 photoelectrically converts an image of a subject image A, which is made incident on the CCD 12 via the optical system 11, for each pixel and sends the image to the AD conversion unit 13. The AD conversion unit 13 subjects an analog value concerning light and shade of each color of each pixel to AD conversion and sends a digital image input signal to the image processing unit 14. Next, the image processing unit 14 executes signal processing such as shading correction and gamma conversion on the inputted digital image input signal to convert the digital image input signal to RGB signals adapted to human sight. As a result, respective pixel data or the like of still image data subjected to image processing are written and stored in the RAM 16 one after another via the RAM controller 15. When all pixel data and additional data for one image are written in the RAM 16, the imaging operation for the one image ends. Note that, in this embodiment, the data are not written in the storage medium 30 immediately every time the imaging operation for one image ends and all the data are written in the storage medium 30 together.

In step S403, the CPU 17 determines whether the image data stored in the RAM 16 is generic image data or key image data. In performing this judgment, the CPU 17 accesses the operating unit IF 23 to thereby check whether the key image imaging signal is generated. As a result of the judgment, if the imaging operation is imaging of a generic image, the CPU 17 proceeds to step S404 (T3). On the other hand, if the imaging operation is imaging of a key image, the CPU 17 proceeds to step S405 (T4).

In step S404, the CPU 17 writes the image written and stored in the RAM 16 in the storage medium 30 as a generic image. For example, the CPU 17 transfers the image stored in the RAM 16 to the generic image storing area 301 of the storage medium 30 and stores the image therein.

In step S405, the CPU 17 writes the image written and stored in the RAM 16 in the storage medium 30 as a key image. For example, the CPU 17 transfers the image stored in the RAM 16 to the key image storing area 302 of the storage medium 30 and stores the image therein.

As described above, the operation of only the shutter button is used as an operation input when generic image data is acquired and, on the other hand, simultaneous pressing of the shutter button and the retrieval button is used as an operation input when key image data is acquired. Consequently the generic image data and the key image data are inputted to the CPU 17 in different operation forms. Therefore, a user can easily distinguish the two kinds of imaging operations from each other clearly and select an imaging operation.

A generic image and a key image are stored in an identical storage medium and a storing area for the generic image and a storing area for the key image are separated. Consequently, it is possible to store key image data and generic image data in a storage medium in distinguishable expressions. In general, since the amount of key image data is smaller than the amount of generic image data, it is possible to extract and select a key image from the storage medium 30 easily and promptly.

Since key image data is stored in the nonvolatile storage medium 30, it is possible to use the key image data repeatedly.

Since key image data and generic image data are stored in different storing areas, it is possible to distinguish the key image data from the generic image data easily. This is very useful for users.

In particular, in the future, as the capacity of storage media increases, it is expected that the number of generic images stored in one storage medium will increase rapidly. Under such circumstances, it is possible to extract a key image promptly. Thus, the technique provided by the invention is a very effective technique.

Preferably, when a key image is imaged, before transferring the image written and stored in the RAM 16 to the key image storing area 302 and storing the image therein, in step S405, the CPU 17 may compress or curtail image data and, then, transfer the image to the storage medium 30 and store the image therein. In this case, it is desirable to adopt a compression ratio higher than a compression ratio for a generic image. This is because a key image is not always required to have a quality as high as that of a generic image. Therefore, by applying compression processing and the like, it is possible to save the storage capacity necessary for storage of the key image. As a result, it is possible to store a large amount of image data in the storage medium 30. This is very useful for users.

Incidentally, as described above, when the shutter button 22A and the retrieval button 22B are pressed simultaneously in the imaging mode (T1), simultaneously with imaging of a key image, the CPU 17 may start retrieval processing in the storage medium 30 in the imaging apparatus 100.

An operation in this case will be hereinafter explained with reference to the flowchart in FIG. 5. Note that the steps explained in FIG. 4 are denoted by the identical reference signs and explanations of the steps are omitted.

In step S403, when the CPU 17 determines that, for example, the shutter button 22A and the retrieval button 22B are pressed simultaneously and an imaging operation for a key image is instructed, the CPU 17 proceeds to step S501. The simultaneous pressing of the shutter button 22A and the retrieval button 22B means that image retrieval processing is started. Note that the image retrieval processing is started with completion of the imaging of the key image (i.e., the key image is usable for retrieval processing) as a trigger.

In step S501, the CPU 17 determines whether other retrieval processing operations has already been started. Since retrieval processing causes an extremely heavy processing load on the apparatus, if two or more retrieval processes are started in parallel, it is likely that imaging processing, reproduction processing, and the like are adversely affected. Thus, it is prohibited to start plural retrieval processings in parallel. If another retrieval processing operation has already been started, the CPU 17 proceeds to step S502 and displays a message meaning "under other retrieval" on the display unit 20 via the display unit IF 21. On the other hand, if another retrieval processing operation has not been started, the CPU 17 proceeds to step S503. Note that steps S501 and S502 are optional and may be omitted. This is because, if the processing abilities of the CPU 17 and the retrieval engine 50 are high, it is also possible to carry out plural image retrievals in parallel.

In step S503, the CPU 17 starts retrieval processing while keeping the state of the imaging mode (T1). In the retrieval processing, the CPU 17 performs the operations described below. When the retrieval processing is started, an under-retrieval flag is set in the retrieval engine 50. The retrieval engine 50 reads out generic images in the storage medium 30 sequentially according to a direct memory access (DMA) operation without the intervention of the CPU 17 and transfers the generic images to the RAM 16. In this case, the retrieval engine 50 may transfer the generic images to an area different from an area for storing key images. The retrieval engine 50 compares images read out by the DMA operation and an image, which is just imaged, sequentially. When there is a similar image, the retrieval engine 50 stores the image in still another area in the RAM 16. When the retrieval engine 50 has finished comparing all the generic images in the storage medium 30 in this way, the retrieval engine 50 releases the under-retrieval flag and sets a retrieval result presence flag in the retrieval engine while holding the similar image, which is a retrieval result, stored in the another area in the RAM 16. The retrieval engine 50 sends a retrieval end interrupt to the CPU 17. Consequently, the series of retrieval processing ends. Note that the CPU 17 may display the retrieval result on the display unit 20 after the retrieval ends or may be displayed on the display 20 when the imaging apparatus 100 enters a reproduction mode described later. In the latter case, the CPU 17 reads out the retrieval result presence flag and, when it is determined that a retrieval result is present, displays an image of the retrieval result on the display unit 20.

Note that, simultaneously with the start of the retrieval processing, the CPU 17 may transfer the key image, which has just been imaged, stored in the RAM 16 to the key image storing area 302 of the storage medium 30 and store the key image therein (S405). However, the key image in this case may be deleted from the RAM 16 without being written when the retrieval processing ends.

Note that, when the start of the retrieval processing (S503) and the writing operation for the key image data performed as required (S405) end, the CPU 17 ends the series of imaging processing for retrieval image data without waiting for the end of the retrieval processing by the retrieval engine 50. In this case, even if the CPU 17 comes into a state in which the CPU 17 can execute the next imaging operation, the retrieval engine 50 may be continuing the retrieval processing in the background. Since the retrieval processing is being performed according to the DMA operation by the retrieval engine 50, the CPU 17 can execute the imaging processing for an image in parallel. In other words, a generic image can be imaged and a key image can also be imaged. However, the CPU 17 performs control such that imaging of a key image is rejected or prohibited until the retrieval end interruption occurs or the under-retrieval flag is released. Incidentally, the imaging apparatus can also shift to the reproduction mode (T2) during retrieval and perform a reproducing operation. This is because the CPU 17 is responsible for most of processing concerning the reproduction mode.

On the other hand, the CPU 17 can display an indication that retrieval is being performed on the display unit 20 by referring to the under-retrieval flag during retrieval. Therefore, a user can recognize that the retrieval processing is being executed in the background in the imaging mode. If the CPU 17 recognizes occurrence of the retrieval end interrupt and release of the under-retrieval flag, the CPU 17 may display an indication that the retrieval ends on the display 20. In this way, the user can grasp whether it is possible to image a key image. This is because, when the retrieval ends, it is possible to image a key image. Note that, if the CPU 17 performs control such a key image in use is not overwritten by the retrieval engine 50, it is possible to image other key images even during retrieval.

As explained above, according to this embodiment, when the shutter button and the retrieval button are pressed simultaneously, the imaging apparatus 100 images key image data and starts image retrieval processing according to the key image data. Thus, it is possible not only to distinguish a generic image from a key image easily but also to start image retrieval immediately after imaging the key image. In other words, work for pressing the retrieval button after the imaging processing is made unnecessary and operation by a user can be reduced.

Since the retrieval engine 50, which is operable in parallel with the CPU 17, is adopted, it is possible to execute an imaging operation and a reproducing operation appropriately while continuing retrieval processing in the background. Thus, a very useful imaging apparatus is provided.

(Operation in a Reproduction Mode)

Figure 6:
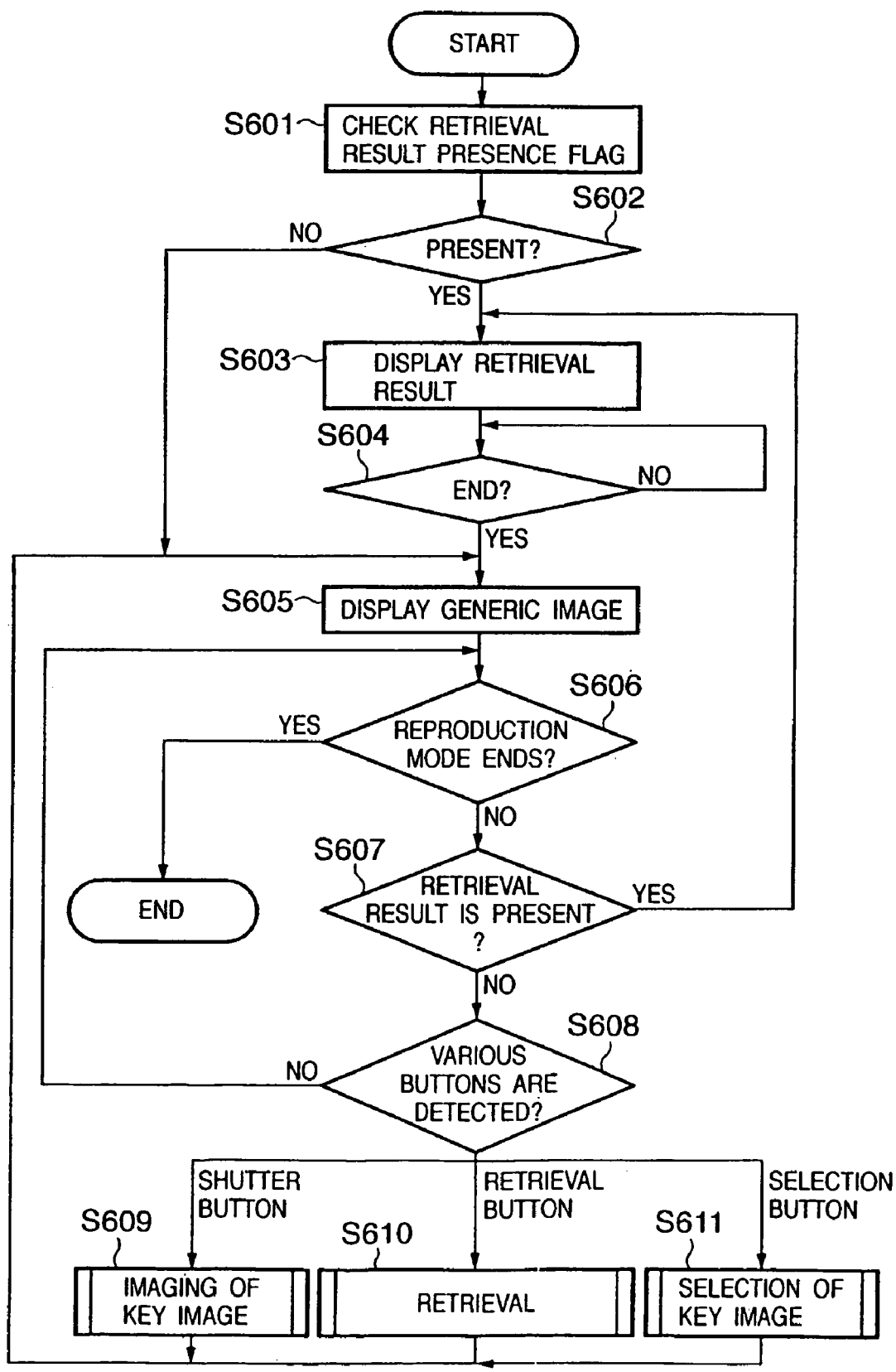
FIG. 6 is a flowchart showing an operation of a reproduction mode according to the first embodiment.

Next, it is assumed that the jog dial for mode setting 22C is set in a reproduction mode and the power switch 22D is pressed to turn on a power supply. In this case, after the power is turned ON, when considerable time elapses and the initial sequence or the like ends, the imaging apparatus 100 transitions to a standby state in a state of a reproduction mode (T2) referred to in FIG. 3. Processing in the reproduction mode will be hereinafter explained with reference to FIGS. 6 to 9. In particular, FIG. 6 is a flowchart showing operations in the reproduction mode according to the first embodiment. The flowchart is started when the imaging apparatus 100 transitions to the standby state in the reproduction mode (T2).

In step S601, the CPU 17 accesses the retrieval engine 50 and reads out the retrieval result presence flag stored in the retrieval engine. Note that access means transmission of an instruction, reception of a response, transmission and reception of data, signals, and the like, readout and writing of data, and the like.

In step S602, the CPU 17 determines whether the read-out retrieval result presence flag is set to mean the presence of a retrieval result. In other words, if this flag is set, this means that the retrieval processing has been executed in the imaging mode and the retrieval processing has ended. Thus, the CPU 17 proceeds to step S603.

In step S603, the CPU 17 reads out a retrieval result (similar image data) stored in a part of areas of the RAM 16 and displays the retrieval result on the display unit 20. In this way, a result-retrieved during the imaging mode is displayed immediately after the imaging apparatus transitions to the reproduction mode (T2). In general, when the imaging apparatus 100 transitions to the reproduction mode, since a user is often free of pressure, it is preferable for the user to check the retrieval result.

In step S604, the CPU 17 determines whether a button instructing the end of the display of the retrieval result (e.g., the retrieval button) is pressed. In this case, the operating unit IF 23 generates a retrieval display end flag in association with the retrieval button 22B. The CPU 17 can detect a display instruction for the retrieval result by detecting the retrieval display end flag by a polling operation or an interrupt operation. In other words, the user presses the retrieval button again after checking the retrieval result, whereby the CPU 17 ends the display of the retrieval result and transitions to step S605.

In step S605, the CPU 17 transitions to an operation in a usual reproduction mode.

On the other hand, in step S602, as a result of reading out the retrieval result presence flag in the retrieval engine 50, if this flag is not set, the retrieval processing is not performed in the imaging mode or the retrieval processing has not ended. In this case, the CPU 17 proceeds to step S605 and displays a generic image on the display unit 20. As a method of display in this case, it is possible to adopt various methods, such as a method of displaying only one latest image and a method of displaying plural thumbnail images.

Although not shown on the flowchart, when the generic image is displayed on the display unit 20, the CPU 17 displays generic images stored in the storage medium 30 sequentially according to an operation input of the display and file operation related buttons 22E, such as an arrow key for inputting a display operation and file operation. The CPU 17 may execute thumbnail display, zoom display of image data, and the like. Note that the thumbnail display and the zoom display are publicly-known techniques and can be carried out by those skilled in the art satisfactorily. Thus, further explanations of the thumbnail display and the zoom display are omitted.

In step S606, the CPU 17 executes polling for detecting the end of the reproduction mode in parallel with the display processing on the display unit 20. If the reproduction mode does not end, the CPU 17 proceeds to step S607 and repeats the polling for the retrieval result presence flag. If a retrieval result is stored in the storage medium 30 or the like anew, the CPU 17 proceeds to step S603 and displays the retrieval result. When the display operation ends, the CPU 17 negates the retrieval result presence flag of the retrieval engine 50

(S604). Thus, the CPU 17 always proceeds to step S608 until the reproduction mode is switched to the imaging mode next time.

In this way, if a retrieval result is not present, the CPU 17 proceeds to step S608 and continues to perform polling to determine the pressing of the various buttons. As the various buttons, there are, for example, the shutter button 22A, the retrieval button 22B, and a key image selection button in the display and file operation related buttons 22E, and the like. It is needless to mention that pressing of these various buttons may be detected by interrupt processing instead of polling. When the shutter button 22A (the operating unit 22) is pressed by the user, the operating unit IF 23 shown in FIG. 1 generates a shutter button ON signal. On the other hand, when the shutter button 22A and the retrieval button 22B are pressed simultaneously, the operating unit IF 23 generates a simultaneous pressing signal in addition to the shutter button ON signal.

In the polling processing in step S606, when the CPU 17 detects that the jog dial for mode setting 22C is in other operation modes, such as the imaging mode, or the power switch 22D is pressed, the CPU 17 ends the reproduction mode.

Figure 7:
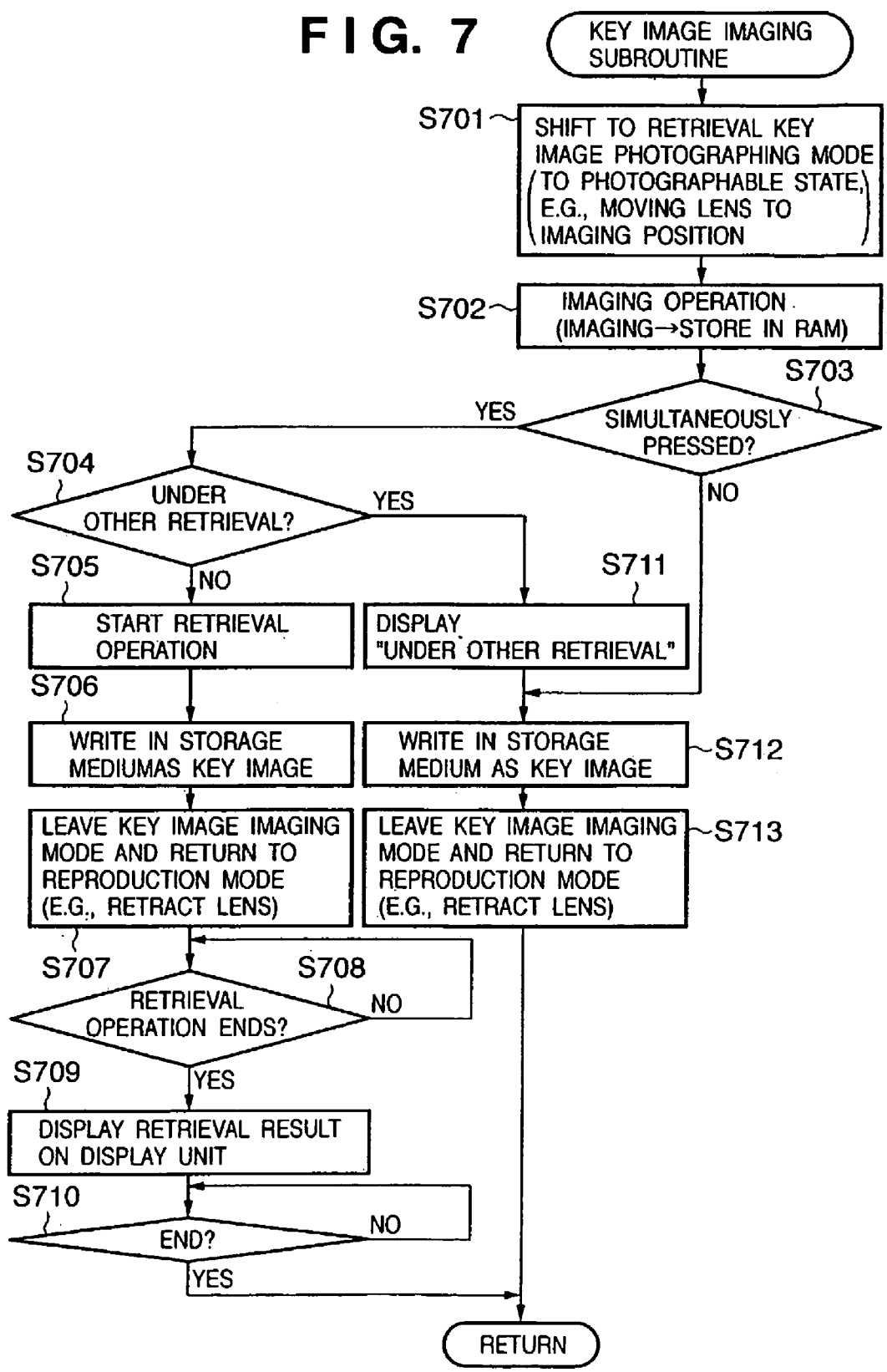
FIG. 7 is a flowchart related to an imaging subroutine for a key image according to the first embodiment.
Figure 8:
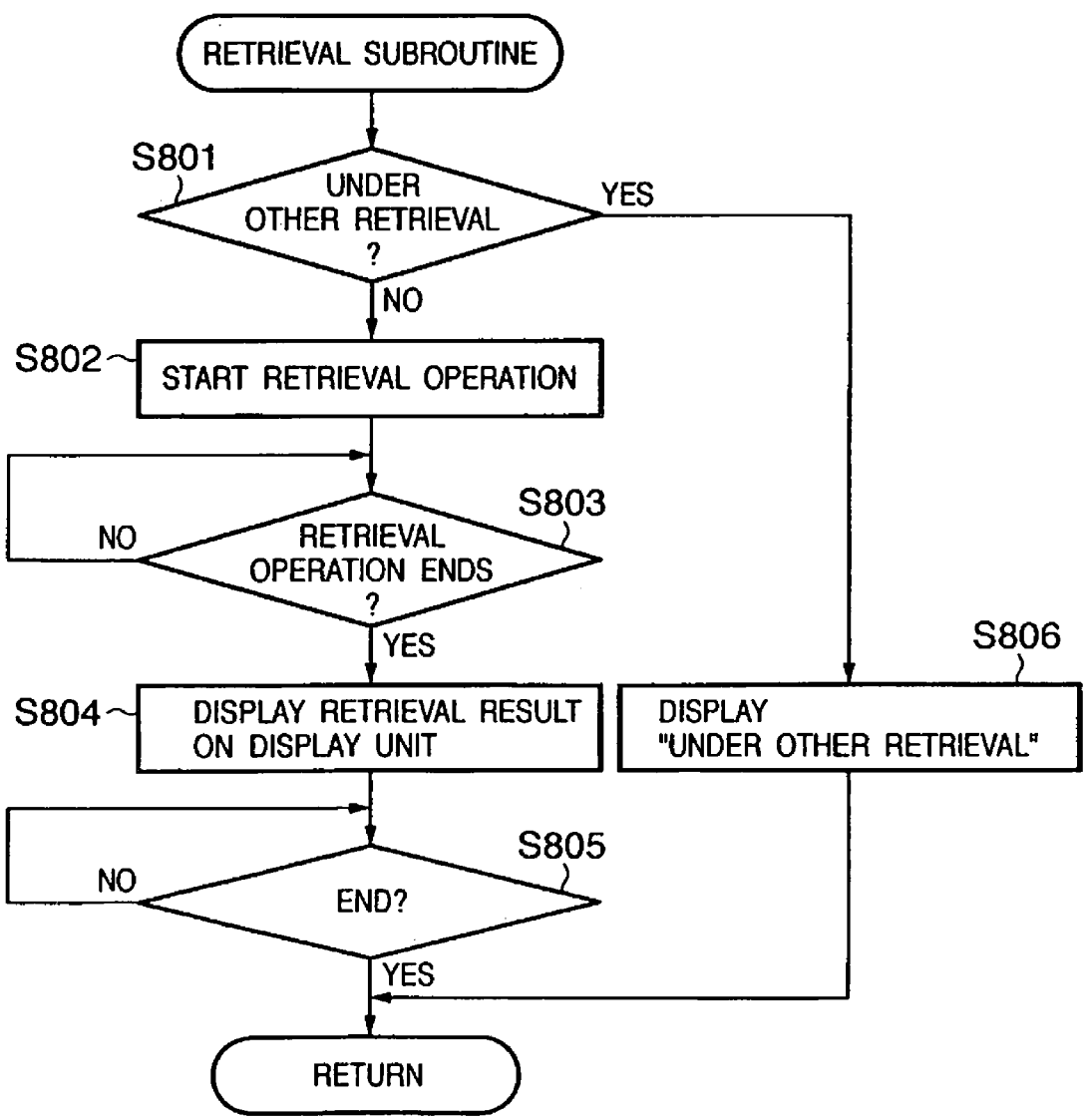
FIG. 8 is a flowchart of a retrieval subroutine according to the first embodiment.
Figure 9:
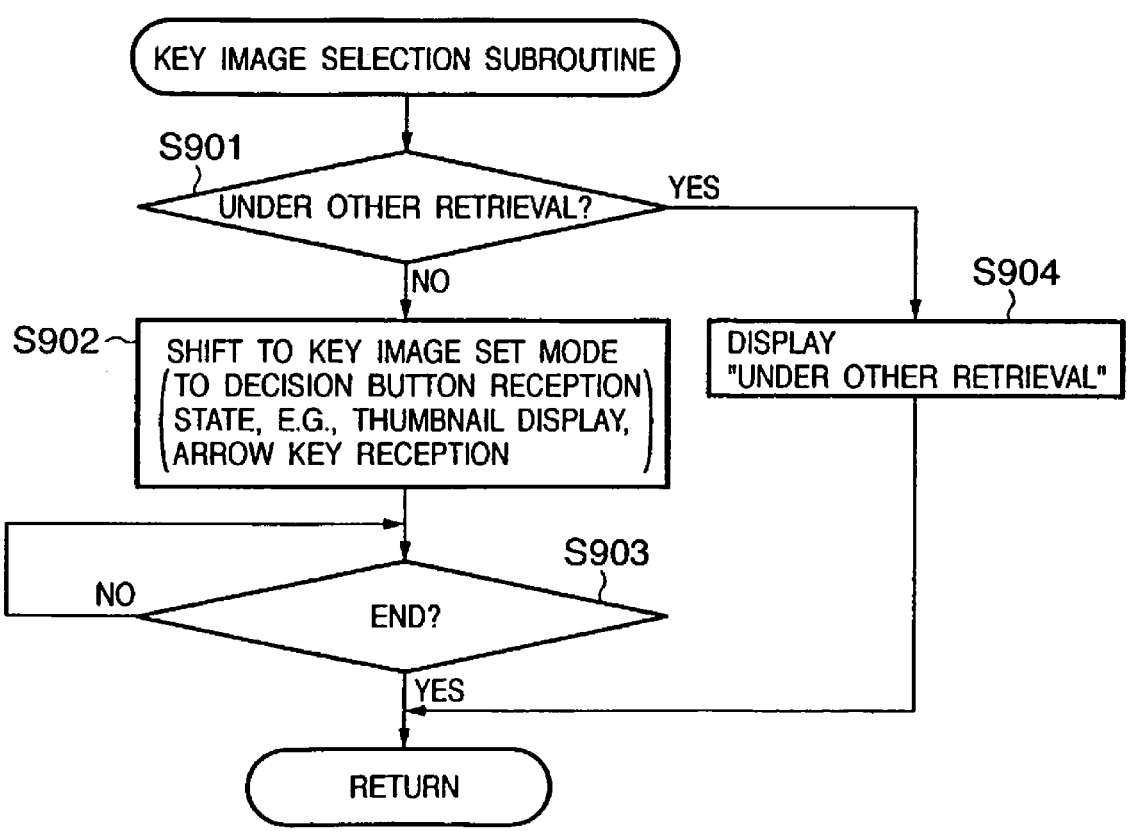
FIG. 9 is a flowchart of a key image selection subroutine according to the first embodiment.

On the other hand, when the CPU 17 detects pressing of the shutter button 22A, the CPU 17 proceeds to step S609 and executes imaging processing for a key image (FIG. 7). When the CPU 17 detects pressing of the retrieval button 22B, the CPU 17 proceeds to step S610 and executes retrieval processing (FIG. 8). When the CPU 17 detects pressing of the key image selection button, the CPU 17 proceeds to step S611 and executes selection processing for a key image (FIG. 9).

(a) The case when the CPU 17 detects pressing of the shutter button 22A will now be discussed.

FIG. 7 is a flowchart showing a key image imaging subroutine according to the first embodiment. This flowchart corresponds to step S609 in FIG. 6. The flowchart is started, for example, when the CPU 17 detects pressing of the shutter button 22A in the reproduction mode. In this case, the imaging apparatus 100 images a key image for image retrieval rather than a generic image.

In this way, when the CPU 17 detects that the shutter button is pressed in a state in which the jog dial serving as a mode selecting unit is set in the reproduction mode, the CPU 17 images key image data. In other words, when the shutter button is pressed in the imaging mode as described above, the operation form is different from that at the time when generic image data is imaged. Therefore, it is possible to distinguish imaging of a generic image from imaging of a key image easily. There is also an advantage that it is possible to image a key image easily in the reproduction mode without switching the reproduction mode to the imaging mode.

In step S701, the CPU 17 shifts to a key image imaging mode (T3) that is a transitional mode. In general, in the reproduction mode, since the imaging apparatus 100 is not in an imagable state in which the imaging apparatus 100 can capture an image data, it is necessary to prepare for imaging. For example, the CPU 17 activates the CCD (or the CMOS area sensor, etc.) 12, the AD conversion unit 13, the image processing unit 14, and the like, changes the imaging apparatus 100 to the imagable state, and, in the case of a retracting lens, moves the lens to a position for imaging to bring the imaging apparatus 100 to a state in which preparation for imaging is completed. When the preparation for imaging is completed, the CPU 17 proceeds to an imaging operation for a key image.

In step S702, the CPU 17 executes the imaging operation. The CPU 17 writes all pixel data and additional data for one image in the RAM 16 according to the same principle and operation as the imaging in the imaging mode. Consequently, the imaging operation for a key image for one image ends. Note that, in this embodiment, as in the imaging mode, the data is not written in the storage medium 30 immediately every time the imaging operation for one image ends and all the data are written in the storage medium 30 together as described later.

In step S703, the CPU 17 detects and determines whether the operating unit IF 23 has generated a simultaneous pressing signal. When the simultaneous pressing signal is generated, the shutter button 22A and the retrieval button 22B are pressed simultaneously. According to the embodiment of the invention, when both the buttons are pressed simultaneously in the reproduction mode, the CPU 17 performs imaging of a key image and storage of the key image in the storage medium 30 and starts retrieval processing of the retrieval engine 50. On the other hand, when only the shutter button is pressed, the CPU 17 only images a key image and stores the key image in the storage medium 30 and does not start the retrieval processing. In other words, in the reproduction mode, it is possible to decide, according to whether both the buttons are pressed simultaneously, whether the retrieval processing is started immediately after a key image is imaged or a key image is only imaged and stored. Note that it is also possible that a key image is imaged and stored when both the buttons are pressed simultaneously and imaging and retrieval processing are started when only the shutter button is pressed. In short, although the shutter button is operated in common, the operation forms only have to be different for the respective cases. Note that operation of the shutter button is not always essential and operation forms only have to be different for the respective cases such that, as a result, it is possible to distinguish imaging of a generic image from imaging of a key image clearly.

When the simultaneous pressing signal is detected, the CPU 17 proceeds to step S704. When the simultaneous pressing signal is not detected, the CPU 17 proceeds to step S712.

In step S704, the CPU 17 accesses the under-retrieval flag and checks whether other retrieval processing still remains. At this point, it is likely that retrieval processing started before, for example, at the time of the imaging mode, is still being executed. Since it is not preferable to start two or more retrieval processes, the CPU 17 checks this flag. However, if a retrieval load can be reduced by, for example, providing plural retrieval engines, plural retrieval processes may be operated in parallel. If the under-retrieval flag is set, since another retrieval processing operation is currently being executed, the CPU 17 proceeds to step S711. On the other hand, if the under-retrieval flag is not set, the CPU 17 proceeds to step S705.

In step S711, the CPU 17 displays an indication that another retrieval operation is being executed on the display unit 20 and, then, proceeds to step S712 without starting a new retrieval processing operation.

In step S705, the CPU 17 sends a retrieval instruction to the retrieval engine 50 to instruct the retrieval engine 50 to retrieve an image on the basis of the key image stored in the RAM 16. The retrieval engine 50 starts the retrieval processing in accordance with this instruction.

In steps S706 and S712, the CPU 17 writes a latest key image stored in the RAM 16 in the key image storing area 302 of the storage medium 30. However, if the retrieval processing has been started in step S705, the CPU 17 may dispose of the key image used for the retrieval processing after the retrieval processing ends without storing the key image on the storage medium 30.

In steps S707 and S713, the CPU 17 leaves the key image imaging mode (T6) and returns to the standby state of the reproduction mode (T2). For example, when the optical system 11 includes a retracting lens, the CPU 17 controls the lens to move to a position for housing the lens.

Note that, when the retrieval processing is not started in the reproduction mode and step S713 ends, the series of procedures ends here and the CPU 17 leaves the subroutine. In other words, the CPU 17 displays a generic image on the display unit 20 (S605) and returns to the original polling state or the like (S606 to S608).

On the other hand, when the retrieval processing has been started, in step S708, the CPU 17 waits for the occurrence of retrieval end interrupt and release of the under-retrieval flag according to the results of a polling operation. The CPU 17 may display nothing on the display unit 20 or display a generic image or the like until the retrieval processing ends. In addition, the CPU 17 may display retrieved images sequentially or display the images with the thumbnail system. If it is determined that the retrieval processing ends, the CPU 17 proceeds to step S709.

In step S709, the CPU 17 displays all results on the display unit 20 sequentially or with the thumbnail system or the like. Consequently, the user can access all retrieval results.

In step S710, the CPU 17 determines whether the imaging mode for a key image should be finished. For example, the CPU 17 checks whether the retrieval button 22B is pressed again in the operating unit IF 23 and a retrieval button ON signal is generated. When the CPU 17 detects the retrieval button ON signal, meaning that imaging should end, the CPU 17 ends this subroutine and returns to the main routine. In other words, the CPU 17 displays a generic image on the display unit 20 (S605) and returns to the original polling state or the like (S606 to S608).

(b) The case when pressing of the retrieval button 22B is detected will now be discussed.

In step S608 in FIG. 6, when the retrieval button 22B is pressed during the reproduction mode, the retrieval processing is executed using a key image selected at this point.

FIG. 8 is a flowchart of a retrieval subroutine according to the first embodiment. This subroutine is equivalent to step S610.

In step S801, the CPU 17 accesses the under-retrieval flag and checks whether other retrieval processing is started. If the under-retrieval flag is set, this means that other retrieval processing is currently being executed. Thus, the CPU 17 proceeds to step S806, displays an indication on the display unit 20 that other retrieval processing is being executed, and ends the subroutine without starting a new retrieval processing operation. On the other hand, if the under-retrieval flag is not set, this means that other retrieval processing is not currently being executed. Thus, the CPU 17 proceeds to step S802.

In step S802, the CPU 17 sends an instruction for starting retrieval processing to the retrieval engine 50. The retrieval engine 50 starts the retrieval processing operation on the basis of a key image that is currently set. Note that it is assumed that an arbitrary key image is always selected as a retrieval key and stored in a specific area of the RAM 16 by the CPU 17.

There is an advantage that, for example, if a key image acquired latest is selected as a key image, a user can start retrieval with a touch of the retrieval button 22B in the reproduction mode. In addition, a key image highly likely to be used for retrieval can be set. On the other hand, a key image acquired earliest may be selected as a key image. In addition, a selected key image may be displayed in all or a part of the display unit 20. On the other hand, when the user desires to perform retrieval processing with a key image different from a key image selected by the imaging apparatus 100, it is possible to perform setting for change or the like of the key image by pressing the key image selection button described later in FIG. 9.

In step S803, the CPU 17 waits for the occurrence of a retrieval end interrupt and release of the under-retrieval flag according to the results of a polling operation. The CPU 17 may display nothing on the display unit 20 or may display a generic image or the like until the retrieval processing operation ends. Alternatively, the CPU 17 may display retrieved images sequentially or display the images with the thumbnail system. If it is determined that the retrieval processing ends, the CPU 17 proceeds to step S804.

In step S804, the CPU 17 displays all the results on the display unit 20 sequentially or with the thumbnail system or the like. Consequently, the user can access all retrieval results.

In step S805, the CPU 17 determines whether the retrieval processing operation should be finished. Since this judgment is the same as the judgment explained in step S710, an explanation of the judgment is omitted.

(c) The case when pressing of the key image selection button is detected will now be discussed.

When the CPU 17 detects that the key image selection button, which is one of the display and file operation related buttons 22E, is pressed in the reproduction mode, the CPU 17 starts change and selection processing for a key image to be used for retrieving.

FIG. 9 is a flowchart of a key image selection subroutine according to the first embodiment. This subroutine is equivalent to step S611 described above.

In step S901, the CPU 17 accesses the under-retrieval flag and checks whether other retrieval processing is started. At this point, it is likely that retrieval processing is still being executed. However, the key image selected before is used in this retrieval processing. Since the started retrieval processing is affected if the key image is changed unreasonably, it is necessary to prohibit selection and change processing for the key image. Thus, in this step, the CPU 17 checks whether the previously-started retrieval processing is still being executed. If another retrieval processing operation is not started, the CPU 17 proceeds to step S902. On the other hand, if other processing is started, the CPU 17 proceeds to step S904, displays a warning indication such as "under other retrieval" or the like on the display unit 20 and leaves this subroutine.

In step S902, the CPU 17 shifts to a key image set mode (T8). First, the CPU 17 reads out a key image from the key image storing area 302 of the storage medium 30 and displays the key image. In reading out and displaying the key image data, for example, the CPU 17 sorts image data in order of the acquisition time or in order of the file names and reads out and displays the image data in accordance with the sorted order. It is needless to mention that the CPU 17 may display the image data with the thumbnail system. Consequently, it becomes easy for a user to find a key image.

In this key image set mode (T8), the CPU 17 is in a state in which the CPU 17 is capable of accepting pressing of an arrow key (a triangle key), which is one of the display and file operation related buttons 22E, a decision button, which is one of the display and file operation related buttons 22E, and the like. Thus, the user can select one key image from the displayed images by using the arrow key (the triangle key). In other words, the user can select one key image stored on the storage medium 30. When the CPU 17 detects pressing of the decision button at the point when the key image is selected, the CPU 17 changes and selects a key image that is used for retrieval.

In step S903, the CPU 17 determines whether the key image set mode should be finished. For example, when the CPU 17 detects pressing of the key image selection button again, the CPU 17 ends this subroutine and returns to step S605.

As described above, in the first embodiment, a first operation input in acquiring generic image data and a second operation input in acquiring key image data are inputted in different operation forms. Thus, the user can distinguish two kinds of imaging operations for a generic image and a key image from each other clearly. Since at least the shutter button 22A is used in both the cases, the user can distinguish the two kinds of imaging operations from each other clearly while being conscious that imaging is performed. In addition, since the operation input in acquiring key image data can be performed by using the shutter button 22A together with other buttons, the user can image a key image while being conscious that imaging processing is performed and the user can achieve this result with a simple operation. Note that it is desirable that the shutter button 22A and the other buttons are arranged in positions allowing the user to press the buttons simultaneously.

In the first embodiment, it is possible to acquire key image data even in a mode other than the imaging mode by at least operating the shutter button for input in the reproduction mode.

In the first embodiment, it is possible to start retrieval immediately after imaging a key image by performing the second operation input in the imaging mode and the reproduction mode. Note that, when only the first operation input is performed in the reproduction mode, a key image is stored and retrieval is not performed. Thus, it is possible to distinguish a generic image and a key image with different plural operation inputs.

It is possible to perform retrieval easily using an imaged image by making full use of the shutter button and the retrieval button according to the modes such as the imaging mode and the reproduction mode. In addition, the imaging apparatus stores a generic image and a key image in distinguishable expressions in an identical storage medium. Thus, even after imaging, it is possible to recognize the generic image and the key image because they are distinguished one from another. Note that it is possible to use the key image repeatedly by storing the key image in a nonvolatile storage medium such as a flash memory.

In this embodiment, it is possible to directly image an image that is used as a key image. As a result, since it is extremely easy to input the key image, it is possible to use a retrieval function conveniently.

According to this embodiment, in addition to the CPU 17 that controls the imaging processing, the reproduction processing, and the like, the retrieval engine 50 operating in parallel with the CPU 17 is mounted on the imaging apparatus 100. Thus, there is an advantage that, even during execution of the retrieval processing, it is possible to continue imaging and reproduction of an image.

According to the reproduction mode in this embodiment, arbitrary image data, such as retrieved image data with the latest acquisition time and the earliest retrieved image data, is set as a retrieval key. Thus, the user can start retrieval processing simply by operating the retrieval button at an arbitrary timing.

Second Embodiment

In a second embodiment of the invention, the method of managing generic image data and key image data in the first embodiment is changed.

Figure 10:
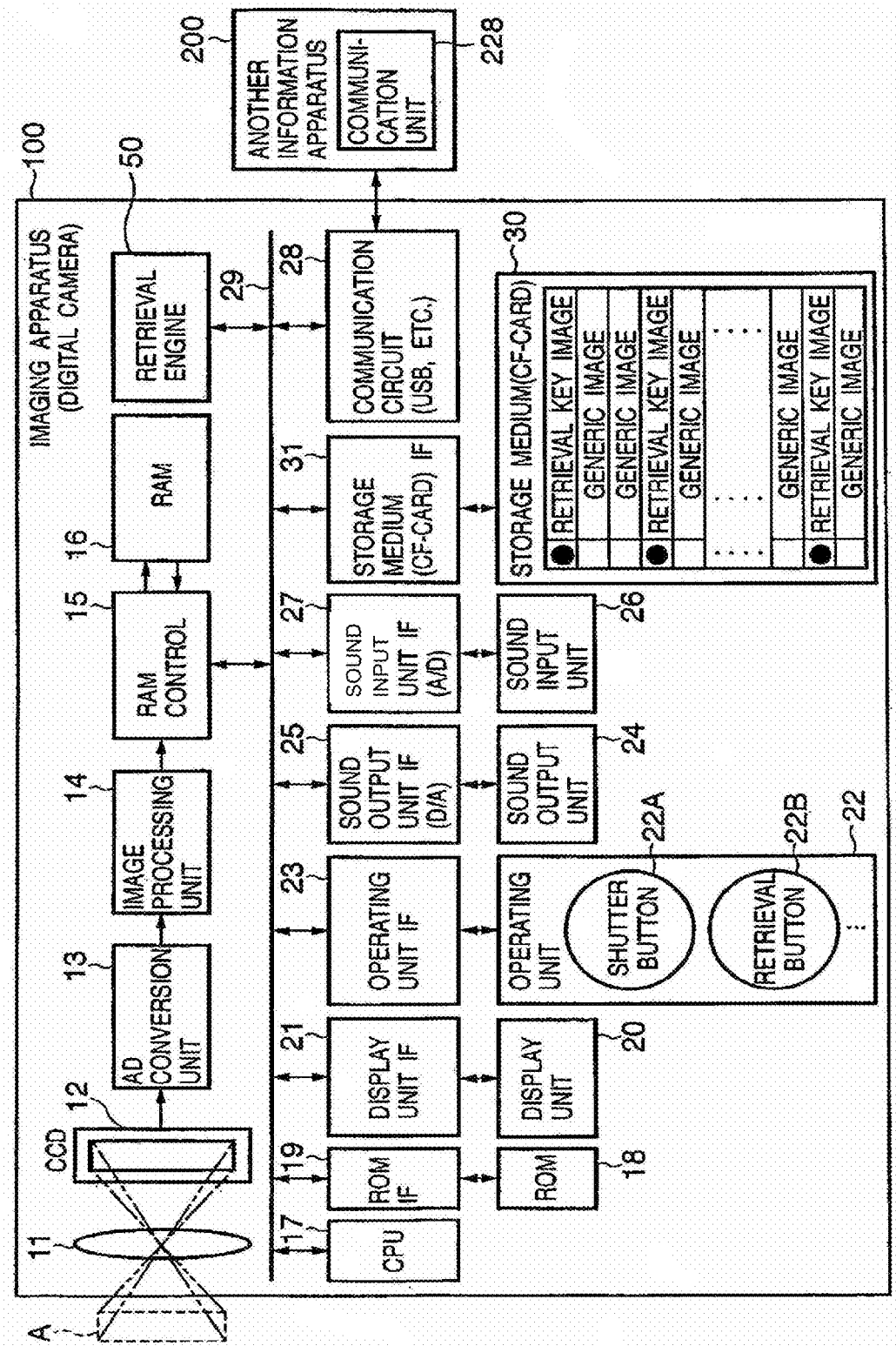
FIG. 10 is a block diagram showing an example of a structure of an imaging apparatus according to a second embodiment of the invention.

FIG. 10 is a block diagram showing an example of a structure of an imaging apparatus according to the second embodiment. Comparing this figure with FIG. 1, it is seen that the method of storing image data on the storage medium 30 is different. In the first embodiment, the storage medium 30 includes the generic image storing area 301 and the key image storing area 302. On the other hand, in the second embodiment, both a generic image and a key image are stored in an identical area of the storage medium 30. Instead, different kinds of file management information are attached to a file allocation table (FAT) section of a generic image file and a FAT section of a key image file. In this embodiment, a data bit "0" is set in a reference portion of the FAT section for a generic image and a data bit "1" is set in a reference portion of the FAT section for a key image. Note that the file management information may be set in image information itself.

In storing a key image on the storage medium 30 in step S405, S706, or S712, the CPU 17 stores the key image without specifically storing the key image in a special key-image storing area. However, the CPU 17 stores the key image with file management information different from that of the generic image data attached in the FAT section, a file of the key image data, or the like. Consequently, it is possible to distinguish the generic image from the key image easily.

In designating a key image in step S902, the CPU 17 can display candidates of the key image on the display unit 20 by reading out the image data attached with the file management information indicating the key information.

As explained above, according to this embodiment, it is possible to obtain the same convenience as the first embodiment without distinguishing storing areas for generic image data and key image data from each other by storing file management information of key image data in the storage medium 30 with identification information, which indicates that the key image data is different from generic image data, attached to the file management information.

Third Embodiment

In the embodiments described above, a generic image and a key image are stored in the storage medium 30 separately.

However, if the key image cannot be used as the generic image, this is inconvenient. In particular, many problems occur when the key image is formed well. For example, it is conceivable to copy the key image and use the copy as generic image data. However, in this case, identical image data are stored redundantly and the storage capacity of a storage medium is wasted. Nevertheless, if an image to be used as a key image is found out of all generic images and set as in the past, the operation is complicated.

Thus, in the third embodiment, although all images are treated as generic images, for a generic image that a user desires to use also as a key image, file management information different from that of the other generic images is attached in a FAT section or the inside of a file. Here, as in the second embodiment, a data bit "0" is set in a reference portion for a generic image and a data bit "1" is set in a reference portion for a key image.

Figure 11:
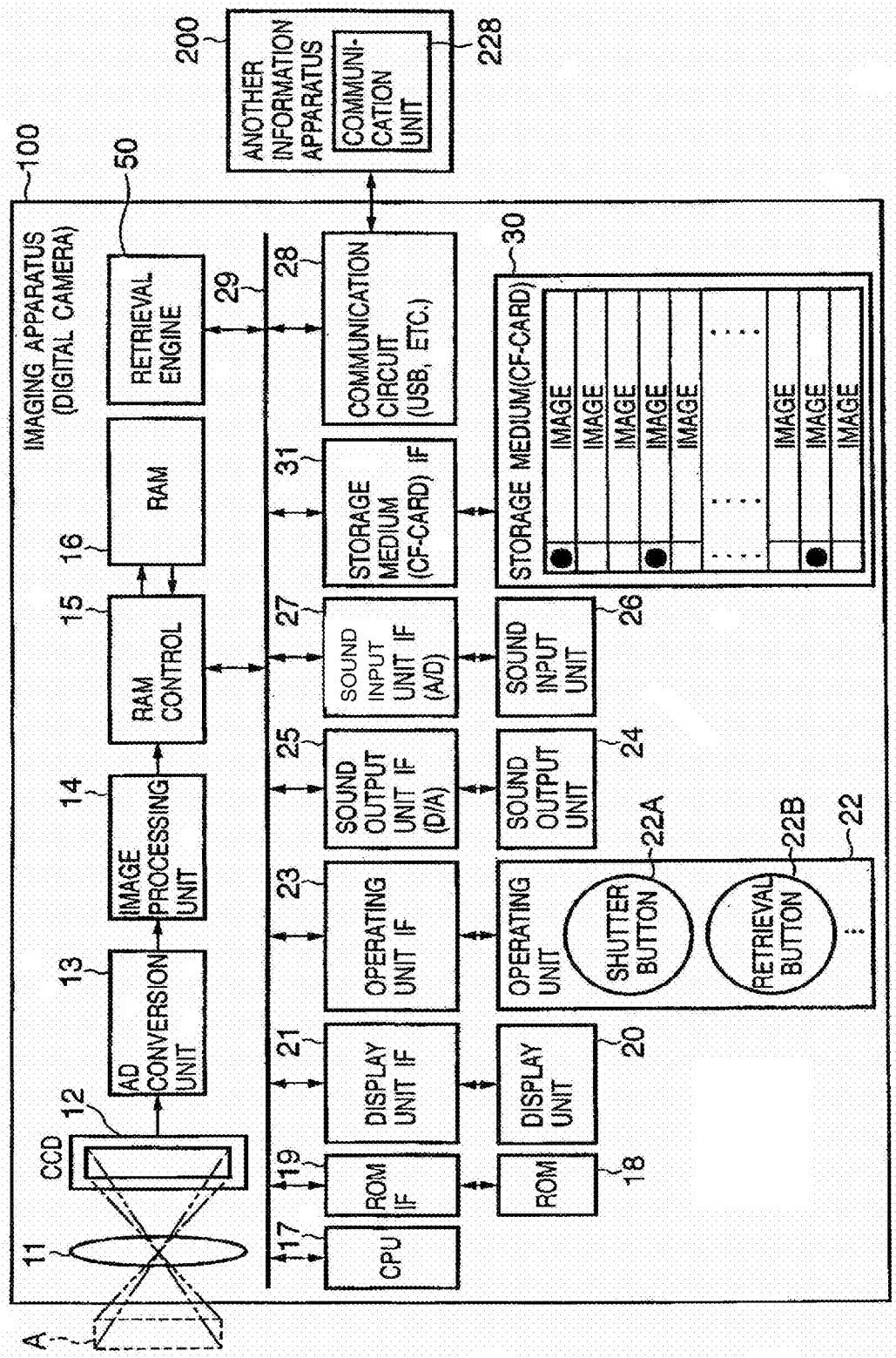
FIG. 11 is a block diagram showing an example of a structure of an imaging apparatus according to a third embodiment of the invention.

FIG. 11 is a block diagram showing an example of a structure of an imaging apparatus according to the third embodiment. In the third embodiment, an image treated as a key image (for a special purpose) in the first and the second embodiments is treated as an image for both a key image and a generic image.

In storing a key image on the storage medium 30 in step S404, S405, S706, or S712, the CPU 17 stores the key image with file management information indicating that the image to which the file management information is attached in a FAT portion, a file of key image data, or the like, is used as both a key image and a generic image. The file management information indicating that an image is used as both a key image and a generic image may be any information as long as this file management information can be distinguished from file management information dedicated for a generic image and file management information dedicated for a key image.

Note that the CPU 17 may store the image without specifically being required to store the image in a specific key-image a storing area or may store the image in the generic image storing area 301 and the key image storing area 302 separately. In other words, it is possible to treat the key image data stored in the key image storing area 302 as the image used as both a generic image and a key image or to treat the generic image data stored in the generic image storing area 301 as the image used as both a generic image and a key image. This is because it is possible to distinguish the image used as both a generic image and a key image according to the file management information in both the cases.

In designating a key image in step S902, the CPU 17 can display candidates of the key image on the display unit 20 by reading out image data attached with the file management information indicating the image is used as both generic information and key information from the storage medium 30. In this way, it is possible to obtain the same convenience as the first embodiment. This is very useful for users.

As explained above, in the third embodiment, information meaning the image used as both a generic image and a key image is attached to image data of a generic image used also as a key image or image data of a key image used also as a generic image. This makes it unnecessary to store both the generic image and the key image redundantly. It is possible to make use of a storage capacity of a storage medium effectively. Moreover, there is also an advantage that a user can find a key image easily.

Fourth Embodiment

In the first, the second, and the third embodiments, in writing image data in the storage medium 30, a key image and a generic image are stored in distinguishable expressions. However, when the storage medium 30 is detachably replaceable, image data imaged by other imaging apparatuses may be stored. Moreover, when such a storage medium 30 is used in the imaging apparatus 100, a key image and a generic image in the storage medium 30 cannot be distinguished from each other in some cases.

In a fourth embodiment of the invention, an imaging apparatus that is useful even in such a case will be explained.

Figure 12:
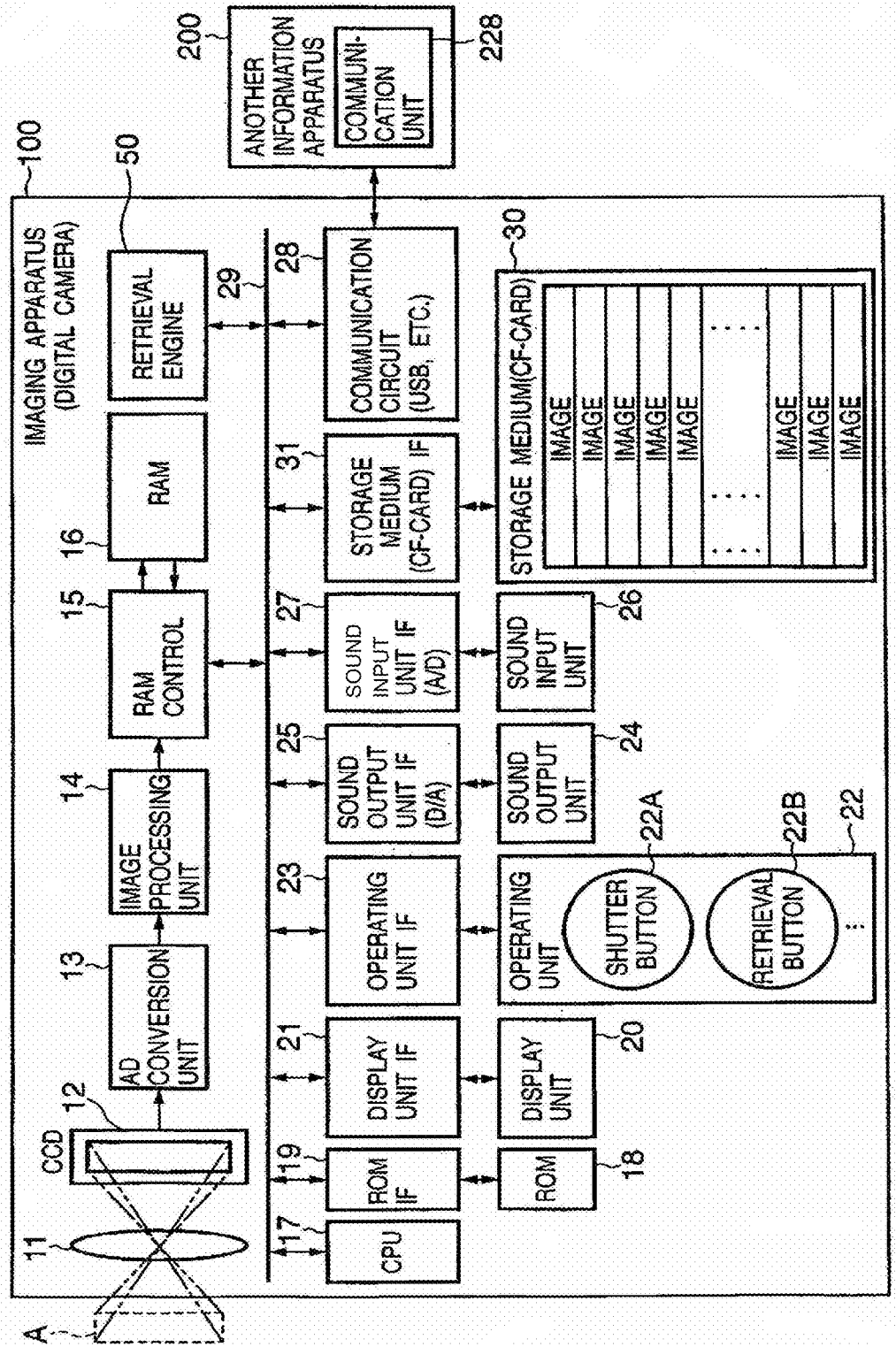
FIG. 12 is a block diagram showing an example of a structure of an imaging apparatus according to a fourth embodiment of the invention.

FIG. 12 is a block diagram showing the imaging apparatus according to the fourth embodiment. In this example, for convenience of explanation, it is assumed that all image data are stored on the storage medium 30 in an identical state. Note that the imaging apparatus 100 shown in FIG. 12 does not have to have the respective functions explained in the first embodiment. In addition, the imaging apparatus in that case does not have to store a key image and a generic image on the storage medium 30 separately or may store the images separately.

Figure 13:
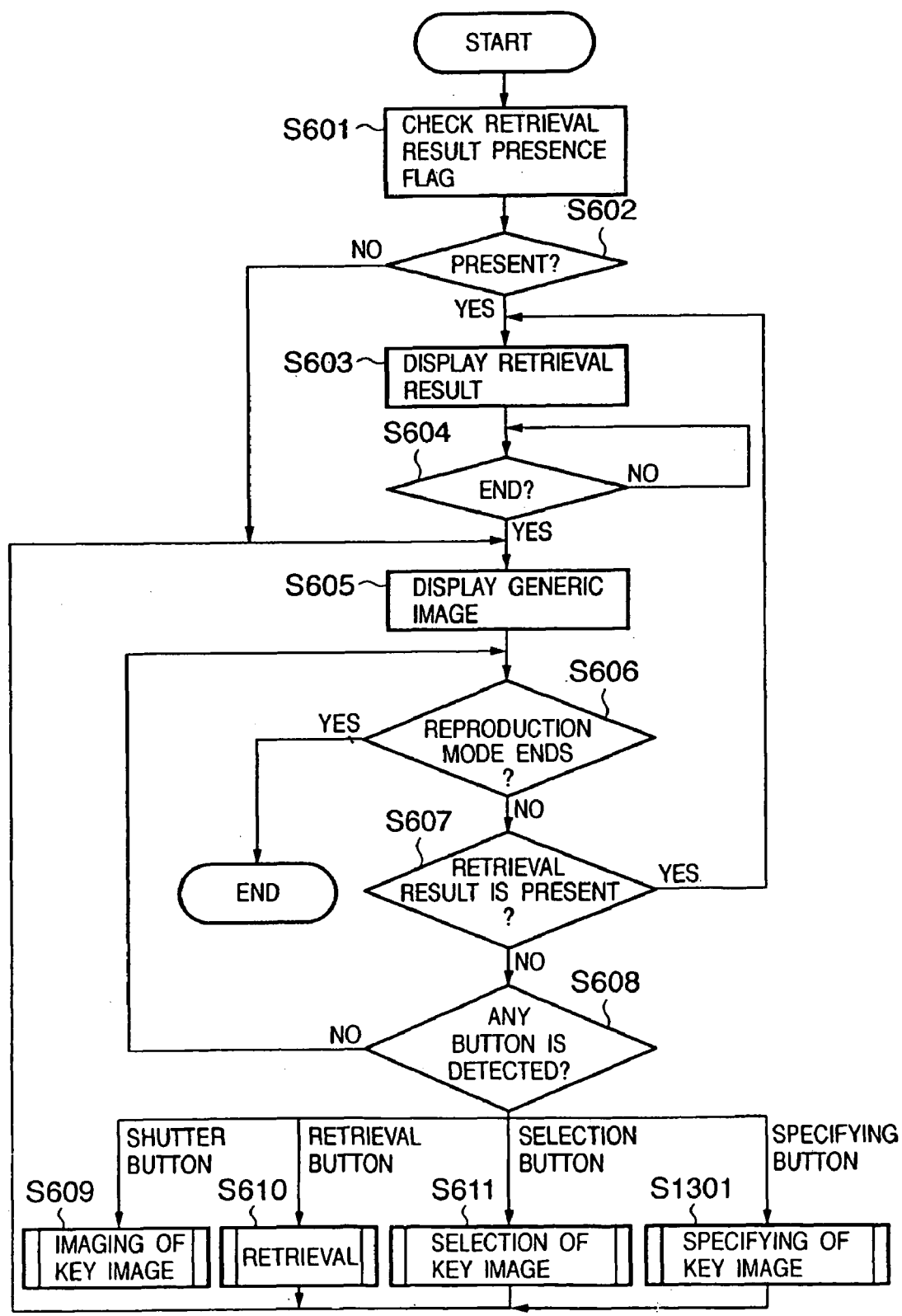
FIG. 13 is a flowchart showing an operation of a reproduction mode according to the fourth embodiment.

FIG. 13 is a flowchart showing an operation of a reproduction mode according to the fourth embodiment. The steps explained in FIG. 6 are denoted by the identical reference signs and the explanations of these steps are omitted. Note that, although it is assumed that an operation or the like in pressing a shutter button in the reproduction mode is identical with the operation shown in FIG. 6, the operations may be different.

According to FIG. 13, when a key image specifying button is detected, the CPU 17 proceeds to step S1301 and executes key image specifying processing. It is assumed that the key image specifying button is also included in the operating unit 22.

In order to use image data written by other imaging apparatuses or the like as a key image, it is necessary to specify the key image.

This key image specifying button is different from the key image selecting button described above, which targets only a key image, in that the imaging apparatus enters a mode for finding an image allocated as a key image out of all images. One button of the display and file operation related buttons 22E may be allocated anew as this key image specifying button. Alternatively, the key image specifying button may be allocated instead of the key image selecting button.

Figure 14:
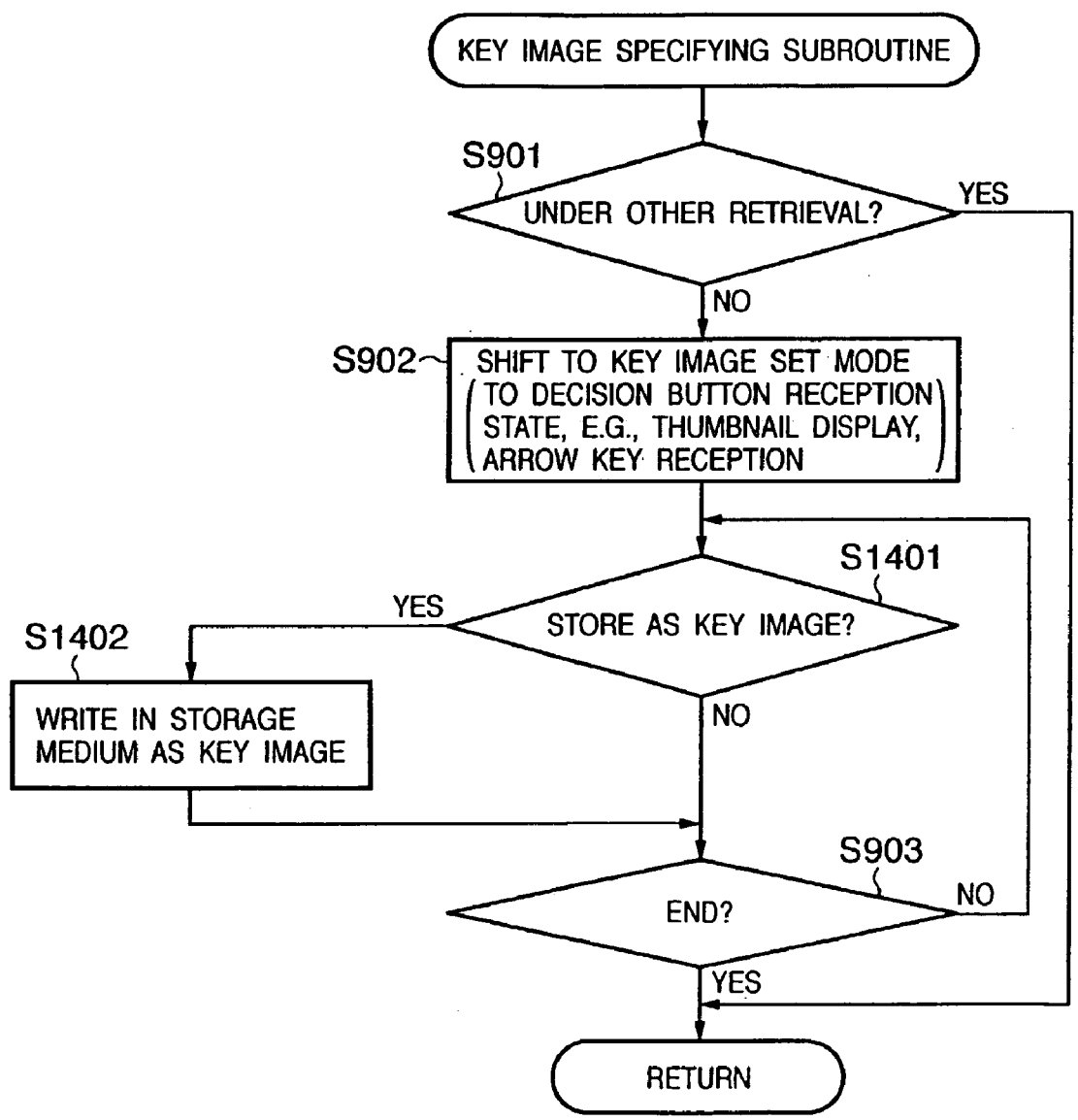
FIG. 14 is a flowchart showing a key image specifying subroutine according to the fourth embodiment.

FIG. 14 is a flowchart showing a key image specifying subroutine according to the fourth embodiment. The subroutine is equivalent to step S1301 in FIG. 13. Note that the steps explained in FIG. 9 are denoted by the identical reference signs and explanations of these steps are omitted.

In step S901, the CPU 17 checks whether other retrieval processing is started. In step S902, the CPU 17 reads out image data stored on the storage medium 30 and displays the image data on the display unit 20 as candidates. When any one of the image data is specified by the operating unit 22, the CPU 17 proceeds to step S1401. Here, a key image is specified out of all images, which is different from the change and the selection of a key image described above.

In step S1401, the CPU 17 determines whether the image data specified by the operating unit 20 should be stored as a key image according to a state of the key image set mode or after the specifying processing ends. For example, the CPU 17 detects pressing of a storing button, to which one of the display and file operation related buttons 22E is allocated, to judge determine that the image data should be stored in the storage medium 30 as a key image. When the image data should be stored as a key image, the CPU 17 proceeds to step S1402.

In step S1402, the CPU 17 stores the specified image data in the storage medium 30 as a key image.

In this way, it is possible to specify one particular piece of image data, which is simply stored in the storage medium 30, and store the specified image data by overwriting or store the specified image data anew as a key image. In this case, it is also possible that the key image storing area 302 is created to store the image data therein or the image data is stored with file management information indicating a key image or an image used as both a generic image and a key image attached thereto.

Thereafter, when the CPU 17 determines in step S903 that the specifying processing should be finished, the CPU 17 returns to the main routine.

According to the fourth embodiment, even if it is impossible to determine whether the image data stored in the storage medium 30 is a key image or a generic image, it is possible to specify a key image easily. For example, this is effective when the storage medium 30 that includes image data imaged by other imaging apparatuses or the like is used in the imaging apparatus 100.

In addition, the image data specified as a key image is stored on the storage medium 30 as a key image. Thus, it is possible to use the key image meaningfully in the imaging apparatus 100 according to the first, the second, or the third embodiment.

Fifth Embodiment

The fifth embodiment of the invention is an improvement on the retrieval subroutine shown in FIG. 8. Depending on convenience of a user, for example, it is conceivable to select an image slightly far from a desired key image and start retrieval processing. In that case, it is likely that the desired key image or an image closer to the key image is retrieved during the retrieval. In that case, it is considered that retrieval noise is reduced and a more sophisticated retrieval result is obtained when the retrieved image closer to the desired key image is set as a key image to retrieve an image. Thus, in this embodiment, it is made possible to select image data found during retrieval processing as a retrieval key and execute the retrieval processing again.

Figure 15:
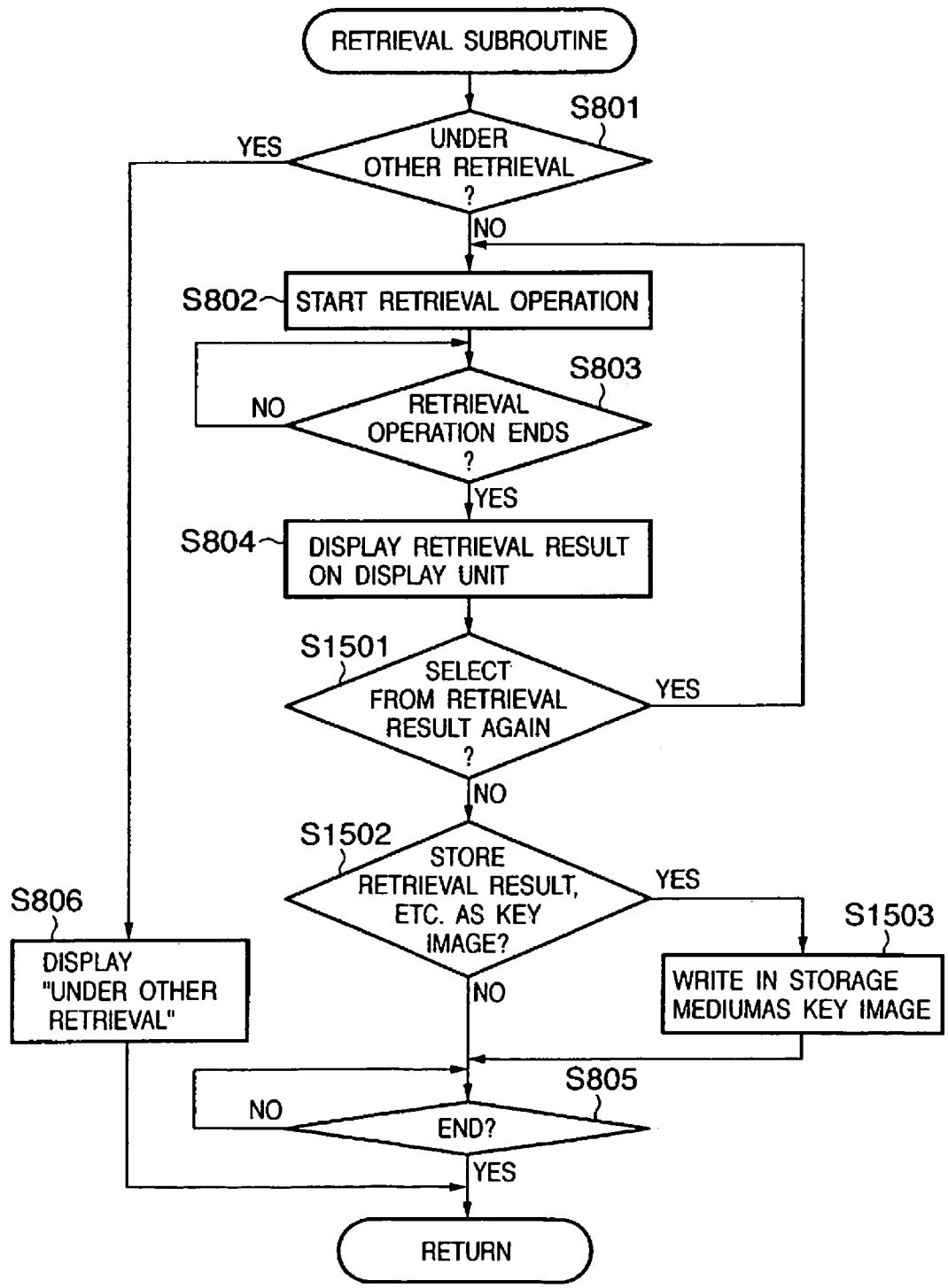
FIG. 15 is a flowchart showing a retrieval subroutine according to a fifth embodiment of the invention.

FIG. 15 is a flowchart showing a retrieval subroutine according to the fifth embodiment. The subroutine is equivalent to step S610 in FIGS. 6 and 13. Note that the steps explained in FIG. 8 are denoted by the identical reference signs and explanations of these steps are omitted. In the following explanation, it is assumed that, in step S804, image data, which a user desires to designate as a key image anew, is retrieved and displayed on the display unit 20.

In step S1501, the CPU 17 determines whether a new key image is designated from a retrieval result. For example, when the CPU 17 detects that the retrieval button 22B is pressed again after an image appearing from the retrieval result is designated by an arrow key (a triangle key) or the like, the CPU 17 selects the designated image data as a key image again, proceeds to step S802, and starts image retrieval using the key image.

On the other hand, if the designated image data is not selected as a key image again, the CPU 17 proceeds to step S1502 and determines whether the retrieval result is stored as a key image. For example, when the CPU 17 detects that an image as the retrieval result or the key image used in the retrieval is designated by the arrow key (the triangle key) and the storing button is pressed, the CPU 17 executes determination processing. When it is determined that the retrieval result should be stored as a key image, the CPU 17 proceeds to step S1503. Otherwise, the CPU 17 proceeds to step S805.

In step S1503, the CPU 17 stores the designated image data in the storage medium 30. A method of storing a key image is as already explained.

As explained above, according to this embodiment, it is possible to designate a new key image out of retrieved image data and execute retrieval processing again. Thus, there is an advantage that it is possible to execute narrow-down retrieval and new retrieval with a simple operation. For example, since the amount of image data stored in the storage medium 30 is enormous, it is possible to start retrieval processing with an image slightly far from a desired key image first and, when closer image data appears, designate the image as a new key image, and execute the retrieval again. While the retrieval is repeated in this way, the probability of retrieval of images close to the desired key image is improved.

Sixth Embodiment

In a sixth embodiment of the invention, a technique for converting a key image and a generic image mutually will be explained.

Figure 16:
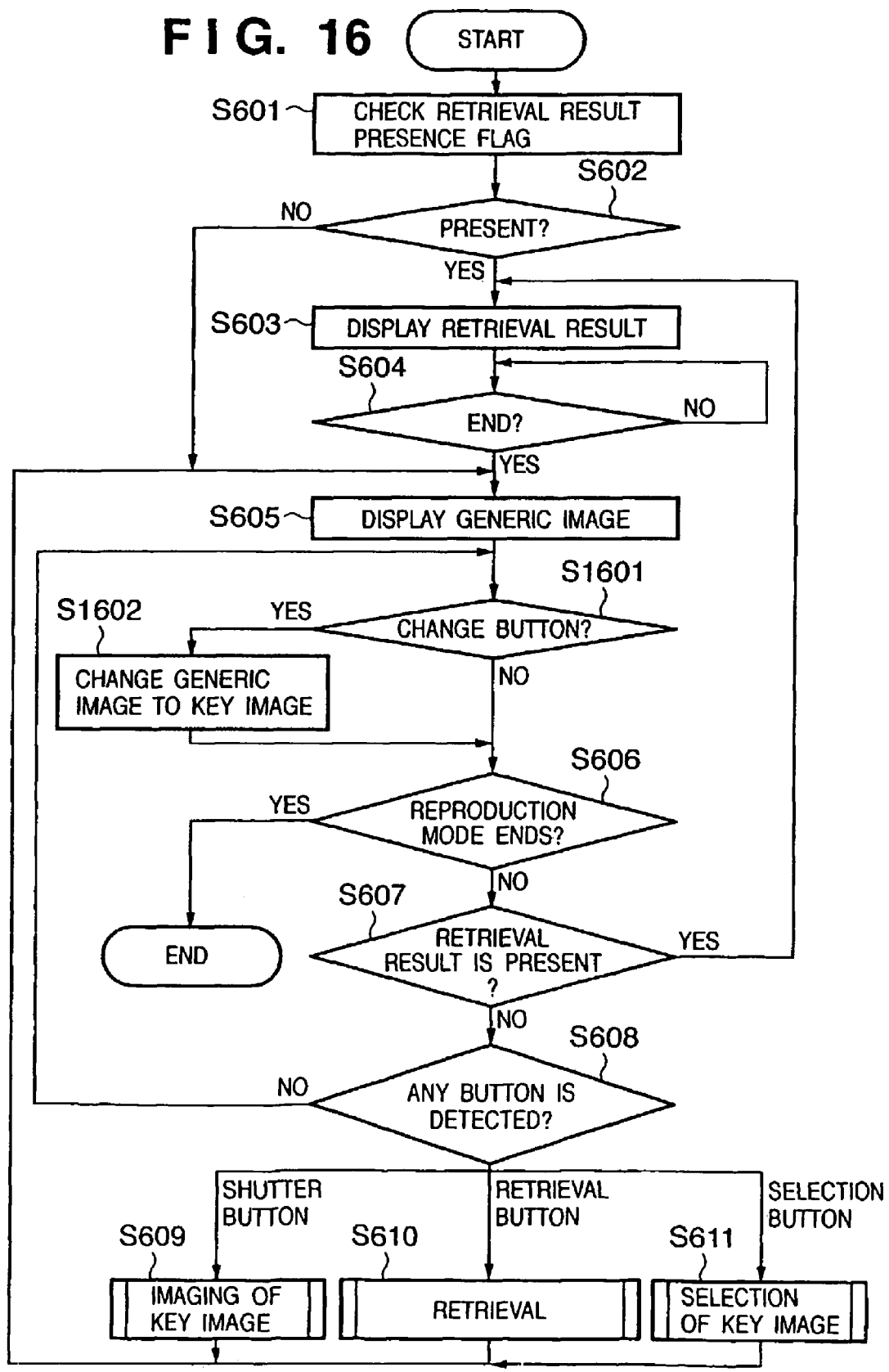
FIG. 16 is a flowchart showing an operation of a reproduction mode according to a sixth embodiment of the invention.

FIG. 16 is a flowchart showing an operation of a reproduction mode according to the sixth embodiment. Note that the steps explained in FIG. 6 are denoted by the identical reference signs and explanations of these steps are omitted.

First, it is assumed that, in step S605, a specific generic image is designated by an arrow key (a triangle key) when generic images are displayed on the display unit 20.

In step S1601, the CPU 17 detects pressing of a change button to which one of the display and file operation related buttons 22E is allocated. When the pressing of the change button is detected, the CPU 17 proceeds to step S1602, changes the designated generic image to a key image, and stores the key image on the storage medium 30. There are various methods of realizing this change processing. For example, the CPU 17 may copy a generic image to create a key image. The CPU 17 may change file management information of a generic image to file management information indicating a key image. The CPU 17 may create a link of generic image data and store the link in the key image storing area 302. Alternatively, the CPU 17 may move image data from the generic image storing area 301 to the key image string area 302. It is needless to mention that the image data may be managed as the image used as both a generic image and a key image.

Note that it is needless to mention that steps S1601 and S1602 may be inserted in the flowchart of FIG. 13.

Figure 17:
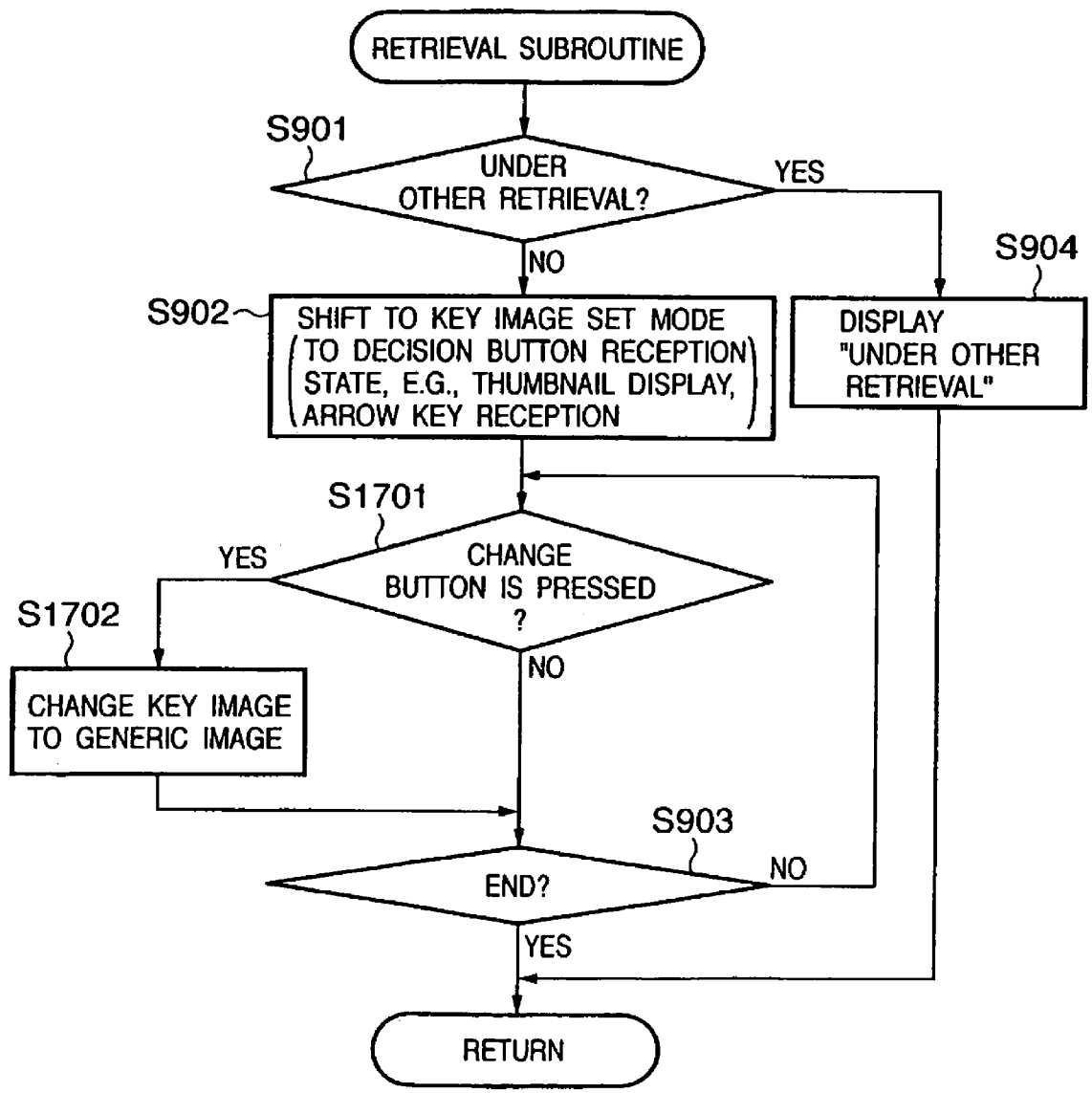
FIG. 17 is a flowchart showing a retrieval subroutine according to the sixth embodiment.

FIG. 17 is a flowchart showing a retrieval subroutine according to the sixth embodiment. Note that the steps explained in FIG. 9 are denoted by the identical reference signs and explanations of these steps are omitted.

When a key image is selected in step S902, if the change button is pressed in step S1701, the CPU 17 proceeds to step S1702 and changes the selected key image to a generic image. A specific example of the change processing is the same as the processing explained about step S1602 except that an object of conversion is opposite.

Note that it is needless to mention that steps S1701 and S1702 may be inserted in the flowchart of FIG. 15.

As explained above, according to the sixth embodiment, it is possible to convert a key image and a generic image mutually. For example, when an image imaged as a key image is an image formed well, it is possible to use the image as a generic image. On the other hand, when it is expected that an image imaged as a generic image is also used as a key image, it is possible to use the generic image also as a key image.

Seventh Embodiment

The various embodiments have been explained above. However, it is needless to mention that a flowchart other than those mentioned above may be used in a range not departing from the technical thought of the invention or the variations described above may be combined in a range not causing contradiction. It is needless to mention that even such modifications belong to the technical scope of the invention as long as the modifications are substantially identical with the constitution of the invention described in claims.

Figure 18:
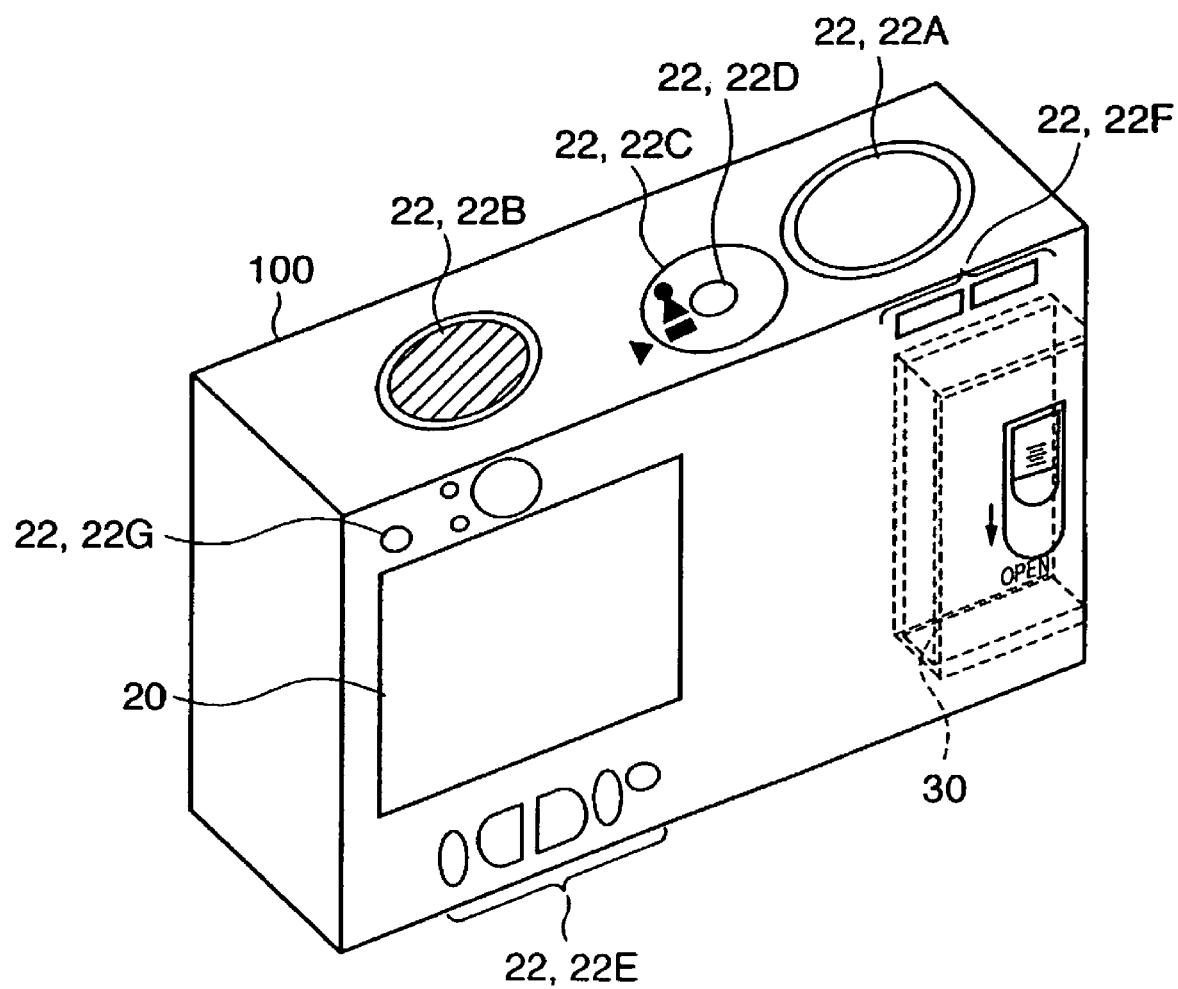
FIG. 18 is an external view of an imaging apparatus according to a modification.
Figure 19:
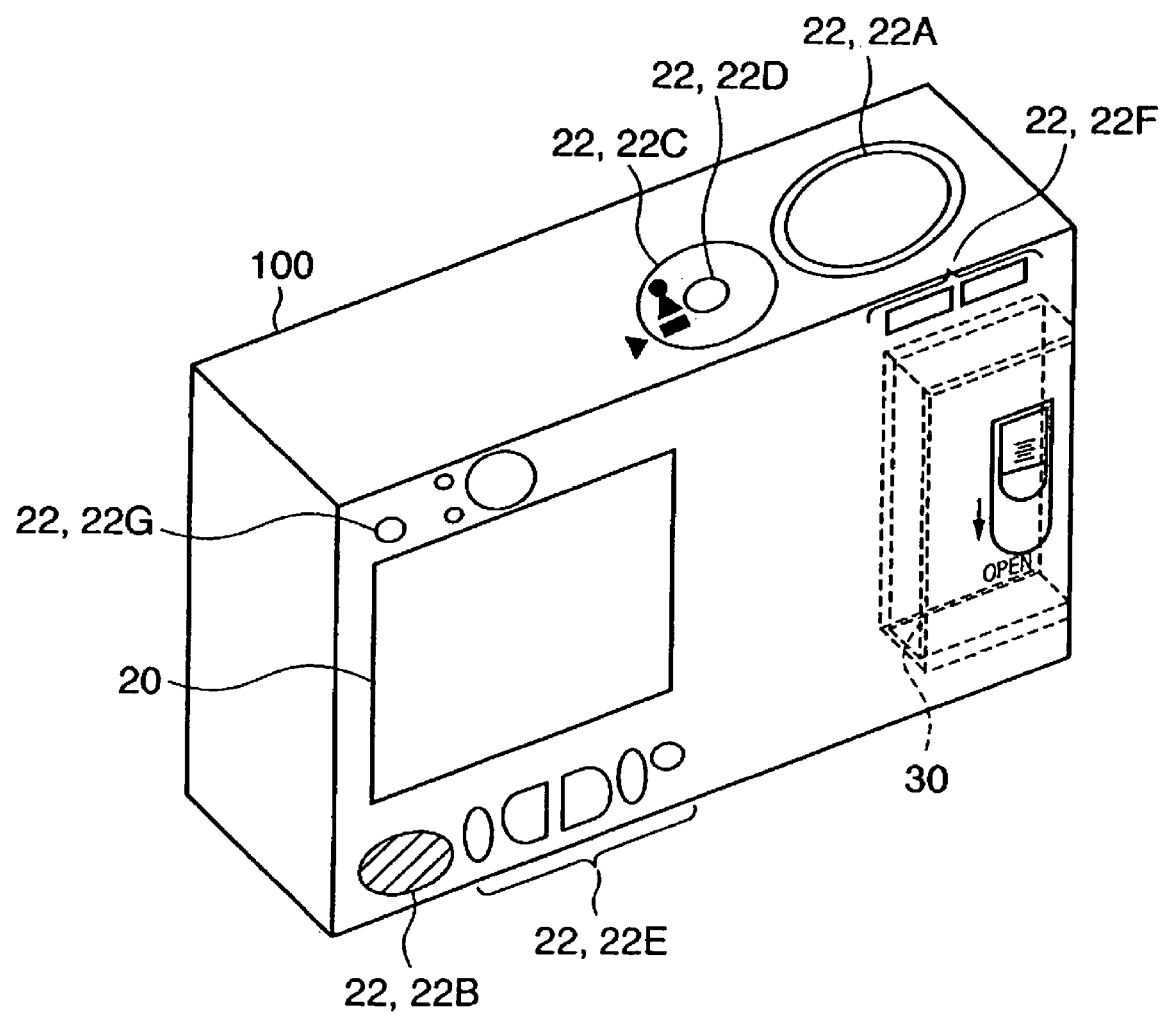
FIG. 19 is an external view of an imaging apparatus according to a modification.

FIGS. 18 and 19 are external views of an imaging apparatus according to a modification. According to FIG. 18, the retrieval button 22B is arranged in a position of a left index finger. According to FIG. 19, the retrieval button 22B is arranged in a position of a left thumb. In short, the retrieval button 22B may be arranged in any position as long as a user can easily operate the retrieval button 22B simultaneously with the shutter button 22A. For example, it is possible to arrange the retrieval button 22B in any position, such as a front surface, a rear surface, a left surface, a right surface, an upper surface, and a lower surface of the imaging apparatus 100.

In the embodiments described above, an operation such as imaging of a key image is started by pressing the retrieval button and the shutter button simultaneously. However, a user interface (UI) for instructing the start of the operation is not limited to this. A different form of UI may be adopted as long as both a retrieval button ON signal and a shutter button ON signal are detected in a camera. For example, a user may press the shutter button while pressing the retrieval button or may press the shutter button within a predetermined time after pressing the retrieval button.

In the invention, in some parts of the explanation, the retrieval processing is executed in the reproduction mode. However, a retrieval mode intended mainly to be used for retrieval may be provided separately. In that case, it is needless to mention that the constitution of the invention can be applied.

Eighth Embodiment

Incidentally, it is likely that a problem occurs in terms of visual recognition unless the screen size of a display device, in which similar image data as a retrieval result is displayed, is taken into account sufficiently. For example, in a digital camera or a cellular phone with a camera function, even if plural similar image data are found, it is difficult to visually compare the similar image data to find which of the similar image data is similar to key image data due to the small size of the screen.

In the invention described in Japanese Patent Application Laid-Open No. 2000-76302, four similar pieces of retrieved image data are arranged and displayed in an identical size. However, the similar image data and a key image data are not displayed simultaneously. Therefore, it is difficult to visually determine which of the similar image data is most similar to the key image data.

Thus, an eighth embodiment of the invention, it is an object to solve such a problem and other problems. Note that the other problems will be understood through the entire specification.

In order to solve the problems, the invention provides an imaging apparatus having a storage medium that stores plural retrieval object image data, wherein the imaging apparatus retrieves similar image data similar to key image data out of the plural retrieval object image data and displays the retrieved similar image data and the key image data in expressions visually distinguishable from each other.

According to this embodiment, since the retrieved similar image data and the key image data are displayed in expressions distinguishable from each other, a user can easily decide which similar image data is most similar to the key image data.

<Example of a Configuration of Hardware>

Figure 20:
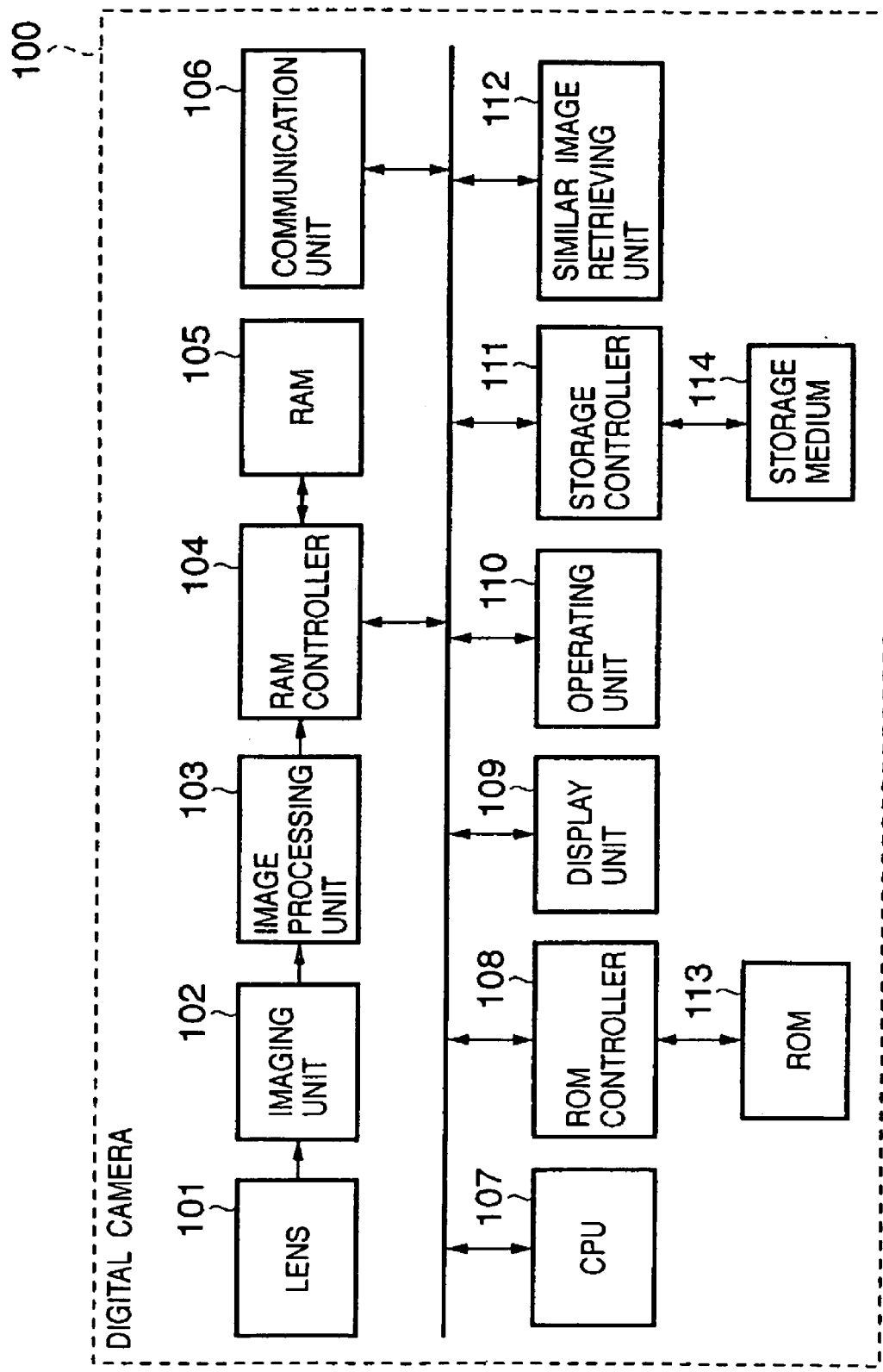
FIG. 20 is a block diagram showing an exemplary structure of an imaging apparatus according to an eighth embodiment of the invention.

FIG. 20 is a block diagram showing an exemplary structure of an imaging apparatus according to this embodiment. The imaging apparatus 100 is an apparatus having an imaging function such as a digital camera, a digital video camera, a cellular phone with a camera, or a PDA with a camera.

The imaging apparatus 100 converts reflected light of a subject made incident through a lens 101 into an electrical signal with an imaging unit 102. The imaging unit 102 includes a photoelectric conversion device, such as a charge coupled device (CCD) and a complementary metal oxide semiconductor (CMOS) sensor.

The imaging unit 102 determines parameters necessary for photographing and displays the parameters on a display unit 109. As the parameters necessary for photographing, for example, there are information related to exposure (e.g., shutter speed and a value of stop), information indicating a focus state, and the like. These kinds of information are generally displayed on an internal liquid crystal display of an optical finder or an external liquid crystal display. Note that it is assumed that the display unit 109 in this example is the external liquid crystal display.

The imaging unit 102 acquires an electrical signal corresponding to an image of a subject and outputs the electrical signal to an image processing unit 103. The image processing unit 103 applies image processing for making it possible to store the electrical signal as image data to the electrical signal. The processing is controlled by a CPU 107 that operates in accordance with a program. Note that it is assumed that a code of a program is stored in a ROM 113 that is controlled by a ROM controller 108.

A RAM 105, which is controlled by the RAM controller 104, stores data related to an operation of the program temporarily.

A communication unit 106 is a communication circuit for communicating with an external device (e.g., a printer). The communication unit 106 executes transmission processing or reception processing for data between the imaging apparatus 100 and the external apparatus, such as a PC or a printer according to the control of the CPU 107.

The image processing unit 103 executes various image processing operations on the electrical signal outputted from the imaging unit 102 and generates image data. The image data subjected to the image processing is stored on a storage medium 114, such as a COMPACTFLASH® card or a hard disk drive while being controlled by a storage controller 111.

When a shutter button provided in the operating unit 110 is operated, the CPU 107 executes photographing processing. In this example, it is assumed that there are two stages in a pressing amount of the shutter button. When the CPU 107 detects that the shutter button is pressed down to a first stage, the CPU 107 outputs an instruction to determine photographing parameters such as the stop value, the shutter speed, and the focus state to the imaging unit 102. When the CPU 107 detects that the shutter button is pressed down to a second stage, the CPU 107 executes photographing processing for acquiring image data. Note that a mechanism of the shutter button is generally known regardless of whether the imaging apparatus 100 is a silver salt camera or a digital camera. Thus, further explanations about the shutter button are unnecessary.

A similar-image-retrieving unit 112 retrieves image data similar to key image data out of image data, which are stored in the storage medium 114 and the RAM 105, as required. For example, when a user photographed a photograph of scenery (image data) during travel, the user retrieves a similar photograph of scenery among photographs photographed before. When the user photographed a person, the user retrieves a photograph of the person out of photographs in the past or retrieves a photograph of a similar facial expression out of photographs in the past paying attention to facial expressions of the person.

There are several most convenient examples of the method of retrieving a similar image. In a first method, for respective pixels in an image, gray scales of the pixels are binarized according to whether the scales are higher or lower than a threshold value to generate a binarized image. The generated binarized image and key image data are compared (e.g., similarity is obtained) to retrieve similar image data. As another method, there are a method of using a histogram representing the brightness of an entire image and a method of performing contour extraction paying attention to a frequency component of an image. As another method, there is a method of comparing information such as color information, a shape of a subject, or inclination and performing similarity retrieval. Note that, in order to improve detection accuracy, similarity retrieval processing only has to be performed using a higher characteristic amount, such as identifying a person and recognizing a facial expression of the person. It is needless to mention that the similarity determining methods are only examples and the invention can adopt other similarity determining method.

<Image Retrieval Processing>

1. Image Retrieval at the Time of Preview

Figure 21:
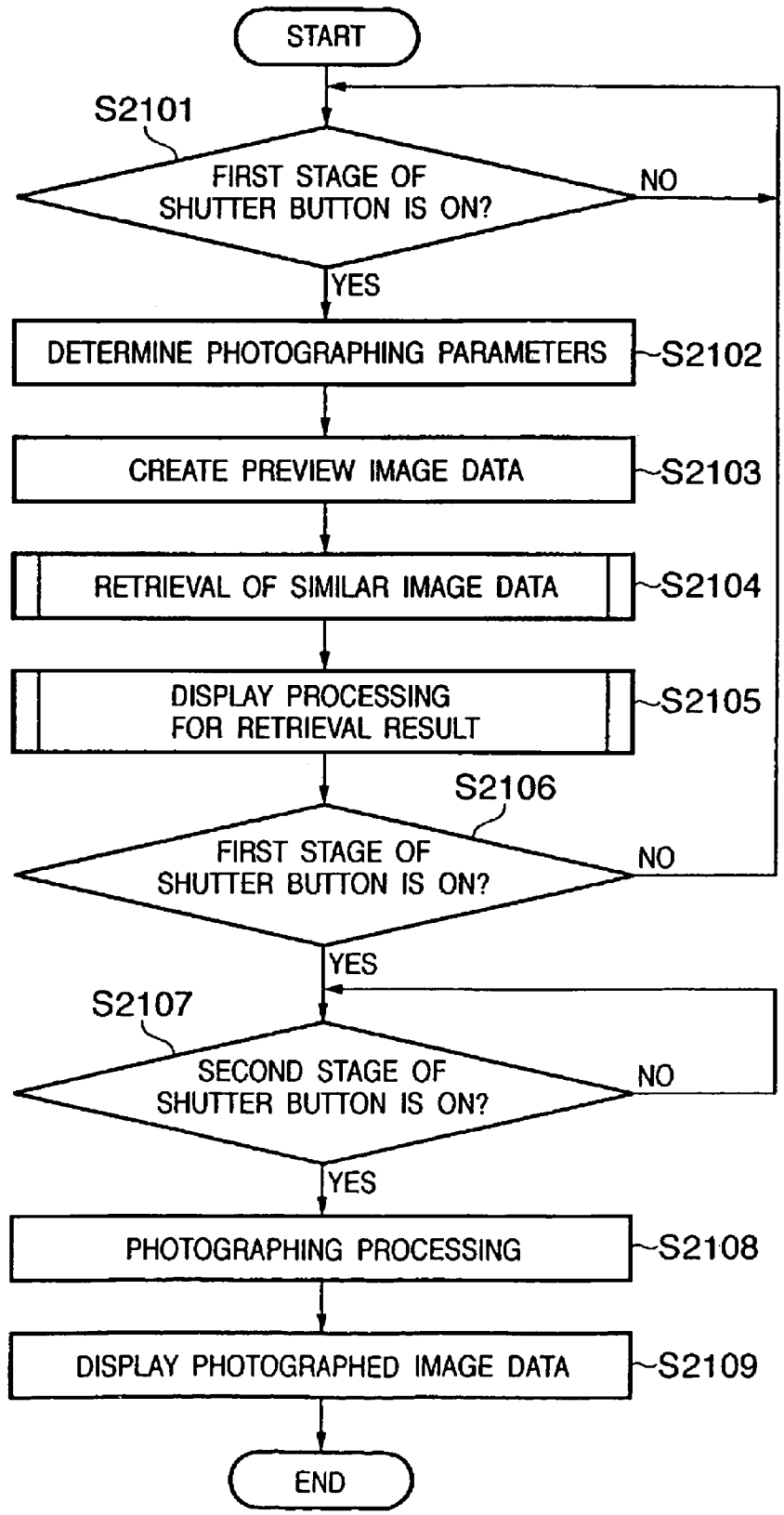
FIG. 21 is an exemplary flowchart of image retrieval processing according to the eighth embodiment.

FIG. 21 is an exemplary flowchart of image retrieval processing according to this embodiment. In this image retrieval processing, in displaying preview image data before photographing processing, image data similar to the preview image data is retrieved.

In step S2101, the CPU 107 detects whether the shutter button included in the operating unit 110 is pressed down to a first stage. If the shutter button is pressed down to the first stage, the CPU 107 proceeds to step S2102.

In step S2102, the CPU 107 controls the imaging unit 102 to determine photographing parameters.

In step S2103, the CPU 107 generates preview image data complying with the determined parameters.

In step S2104, the CPU 107 causes the similar-image-retrieving unit 112 to execute retrieval processing with the generated preview image data as key image data. The similar-image-retrieving unit 112 retrieves similar image data similar to the key image data from the storage medium 114.

In step S2105, the CPU 107 displays the retrieved similar image data and the preview image data in expressions visually distinguishable from each other. The CPU 107 may use any method to display the retrieved similar image data and the preview image data as long as both the image data can be distinguished visually. For example, the retrieved similar image data and the preview image data are displayed in parallel.

Figure 22:
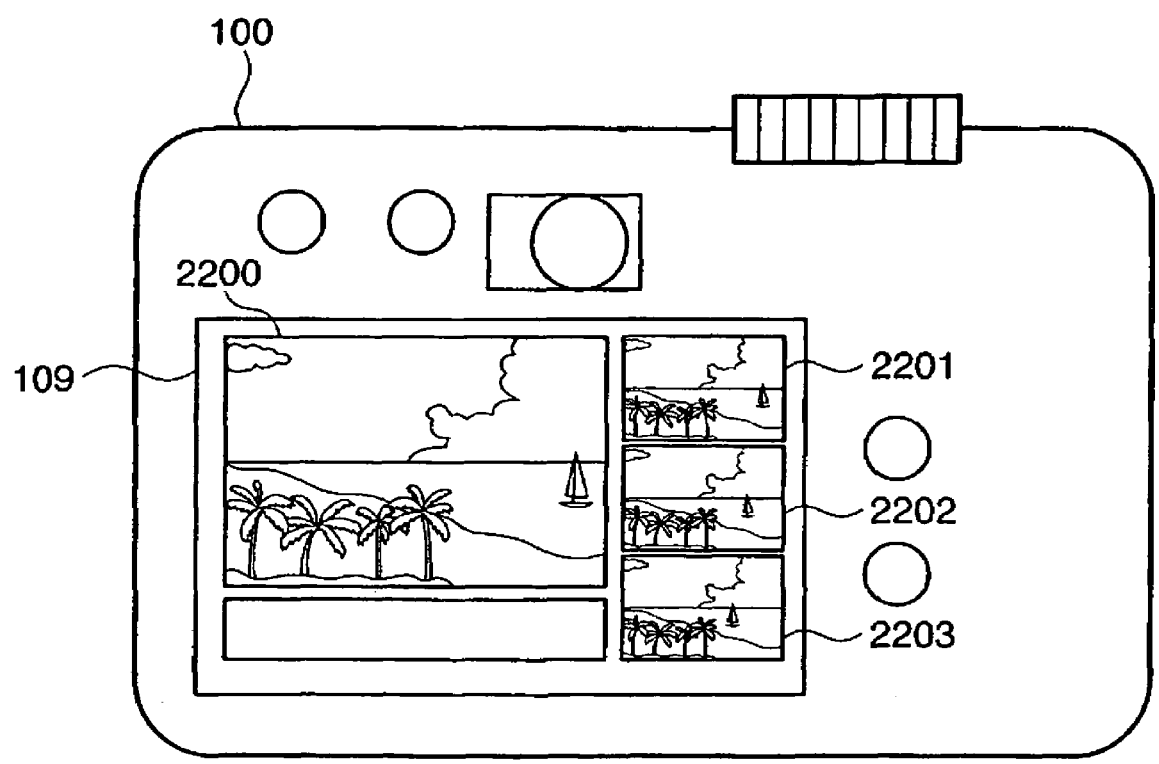
FIG. 22 is a diagram showing an example of display of a retrieval result according to the eighth embodiment.

FIG. 22 is a diagram showing an example of display of a retrieval result according to this embodiment. Key image data (e.g., preview image data) 2200 and similar image data 2201 to 2203, which are retrieval results, are displayed on the display unit 109.

In step S2106, the CPU 107 detects whether the shutter button included in the operating unit 110 is pressed down to the first stage. If a state in which the first stage of the shutter button is ON is not continued, the CPU 107 regards that photographing is stopped and returns to step S2101. If the ON state is continued, the CPU 107 proceeds to step S2107.

In step S2107, the CPU 107 detects whether the shutter button included in the operating unit 110 is pressed down to the second stage. If the shutter button is pressed down to the second stage, the CPU 107 proceeds to step S2108.

In step S2108, the CPU 107 executes photographing processing. For example, the CPU 107 applies compression processing or the like to data outputted from the imaging unit 102 in the image processing unit 103, creates image data, and writes the created image data in the storage medium 114.

In step S2109, the CPU 107 displays the image data subjected to the photographing processing on the display unit 109.

According to this embodiment, image data similar to preview image data is retrieved out of image data stored in the storage medium 114 or the RAM 105 and the preview image data and the similar image data are displayed in expressions visually distinguishable from each other. Therefore, a user can easily evaluate the retrieved image data.

According to this embodiment, since preview image data is used as key image data, it is possible to reduce useless photographing processing. For example, when the user intends to execute photographing for fear of forgetting photographing of a subject, if similar image data for the subject is present in a storage medium, the user can stop photographing. Therefore, it is possible to prevent useless photographing in advance.

Conversely, when the user displays a subject, which the user forgot to photograph, as preview, since similar image data is not found and is not displayed on the display unit 109, the user can recognize that the user forgot to photograph the subject. Thus, an effect of preventing the user from forgetting photographing of an image can also be expected. Note that, if the CPU 107 displays a warning such as "similar image data is not found" on the display unit 109 or a liquid crystal display section in a finder, it is easier to prevent the user from forgetting photographing.

Incidentally, in a RAW image or the like that takes time in photographing processing because of a large amount of data, the effect of stopping photographing processing is greater r compared with using a JPEG format or the like. Since the amount of image data of a RAW format is large compared with the JPEG format or the like, a time lag from first photographing operation until the next photographing operation is large. When photographing is performed in such a RAW format, a user can easily decide whether photographing is necessary on the basis of a retrieval result by retrieving similar image data in preview before photographing. According to this embodiment, since it becomes easy to avoid useless photographing processing in this way, it is possible to execute photographing processing smoothly even if image data of the RAW format is used.

Note that, in executing image retrieval for the preview image data, the CPU 107 may execute the image retrieval after determining whether the setting is made to execute the image retrieval. For example, the CPU 107 performs image-retrieval setting and skip-image-retrieval setting in advance to execute or skip image retrieval at the time of preview according to an instruction from the operating unit 110. The CPU 107 stores contents of such setting in the ROM 113, such as an EEPROM, and uses the contents of such a setting as a reference at the time of such a determination. If the camera is set to skip image retrieval at the time of preview depending on the convenience of a user, since photographing is never interrupted by the image retrieval, the user can concentrate on the photographing.

2. Image Retrieval Immediately after Photographing

In the embodiments described above, a similar image is retrieved at the time of preview processing. However, in this embodiment, image retrieval is carried out immediately after photographing processing.

Figure 23:
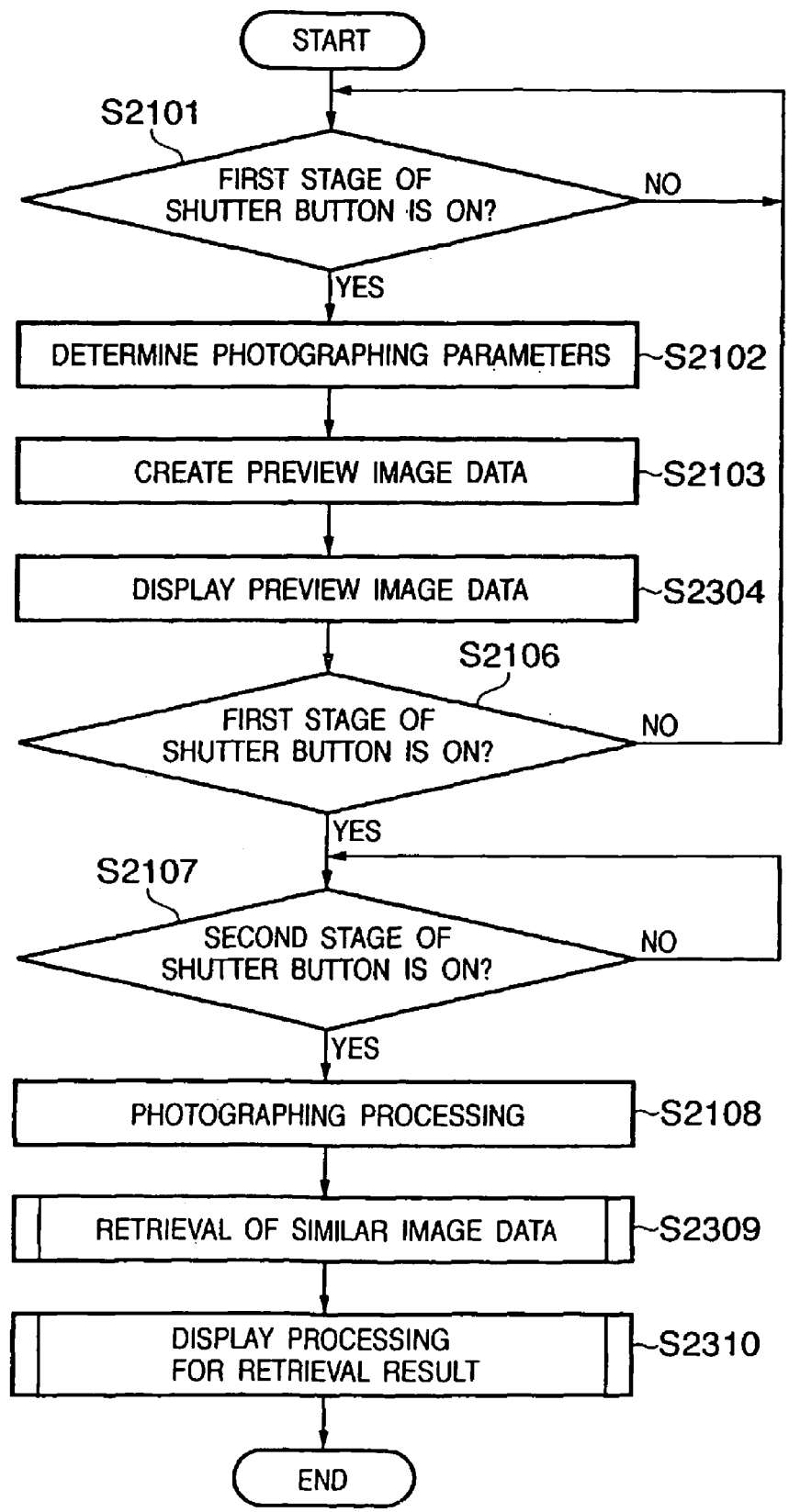
FIG. 23 is another exemplary flowchart of the image retrieval processing according to the eighth embodiment.

FIG. 23 is another exemplary flowchart of the image retrieval processing according to this embodiment. Note that the steps already explained are denoted by the identical reference signs to simplify explanations.

After executing steps S2101 to S2103, in step S2304, the CPU 107 displays the preview image data on the display unit 109. Thereafter, the CPU 107 executes steps S2106 to S2108, executes photographing processing for a subject, and proceeds to step S2309.

In step S2309, the CPU 107 causes the similar-image-retrieving unit 112 to execute retrieval processing with the image data subjected to the photographing processing as key image data. The similar-image-retrieving unit 112 retrieves similar image data similar to the key image data from the storage medium 114 or the RAM 105.

In step S2310, the CPU 107 displays the retrieved similar image data and the image data of the subject in expressions visually distinguishable from each other. For example, as shown in FIG. 22, the CPU 107 displays the retrieved similar image data and the image data of the subject in parallel.

According to this embodiment, immediately after the photographing processing and before the next photographing processing, a user can compare and evaluate image data obtained by the photographing processing and existing image data. For example, when photographing is redone for a certain subject, it becomes easy to evaluate a first photographing result and a photographing result obtained by redoing the photographing.

Note that, as described above, the CPU 107 may execute image retrieval after determining whether the camera is set to execute the image retrieval. The user can select whether the image retrieval should be executed at the time of preview, should be executed immediately after photographing, or should not be executed at all at these timings Note that the image retrieval processing may be executed at the time of inspection of image data. For example, the CPU 107 displays image data selected by the operating unit 110 on the display unit 109 and, when image retrieval is instructed by the operating unit 110 subsequently, executes the image retrieval and displays similar image data. This makes it possible to execute image retrieval at the time of inspection of image data and display key image data and similar image data in forms that can be compared with each other.

3. Skip of Image Retrieval Processing at the Time of Continuous Photographing

Image retrieval processing produces a relatively heavy processing load compared with processing for photographing one image to produce corresponding image data. Therefore, when image retrieval processing is executed for each of image data obtained at the time of continuous photographing, it is likely that the continuous photographing speed falls excessively. Thus, in this embodiment, when continuous photographing processing is executed, the fall in continuous photographing speed is controlled by skipping retrieval processing for similar image data.

Figure 24:
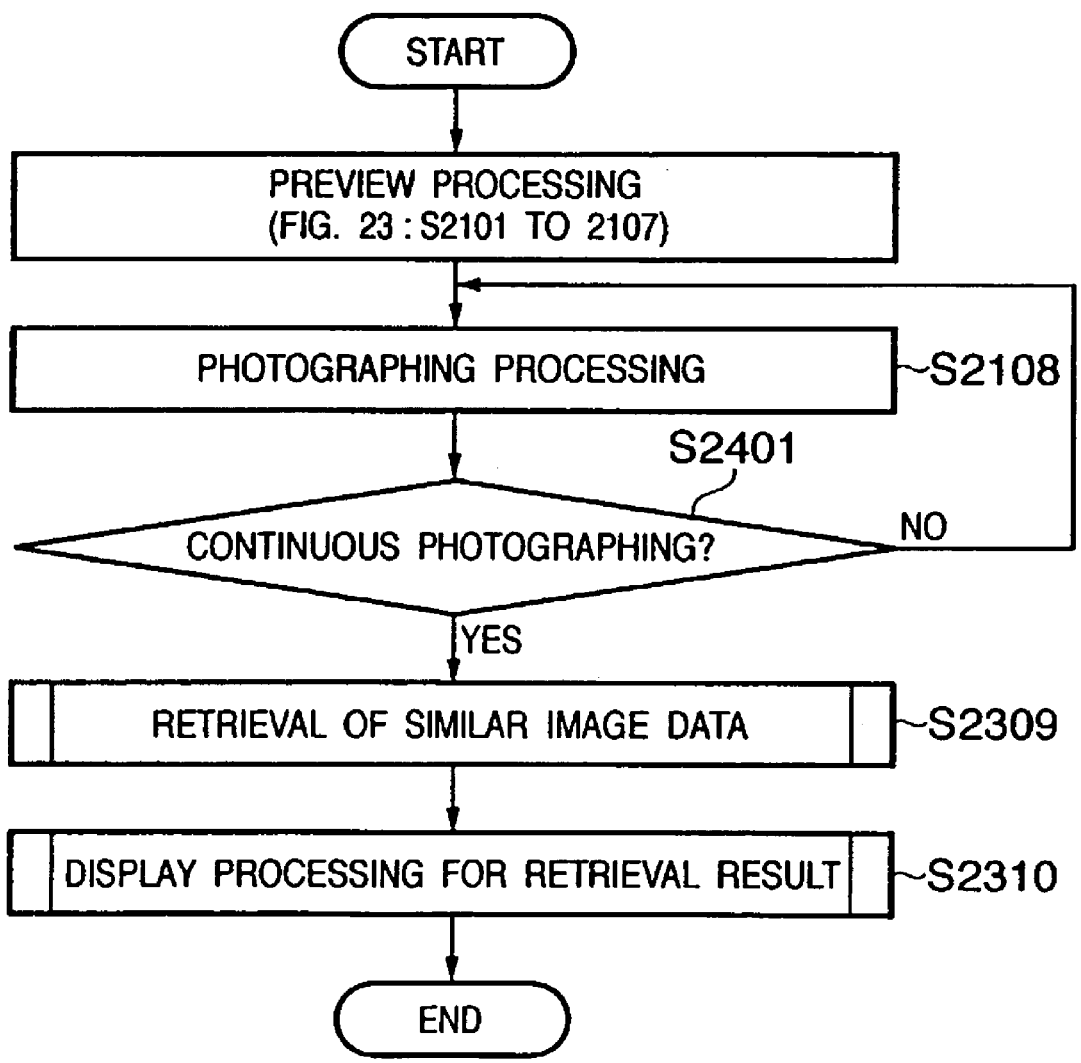
FIG. 24 is still another exemplary flowchart of the image retrieval processing according to the eighth embodiment.

FIG. 24 is still another exemplary flowchart of the image retrieval processing according to this embodiment. Note that the steps already explained are denoted by the identical reference signs to simplify explanations.

After executing steps S2101 to S2107, in step S2108, the CPU 107 applies photographing processing to one image data. Thereafter, the CPU 107 proceeds to step S2401.

In step S2401, the CPU 107 determines whether continuous photographing is instructed by the shutter button of the operating unit 110. For example, the CPU 107 determines whether the shutter button is continuously pressed down to the second stage. When the continuous photographing operation is instructed, the CPU 107 skips retrieval processing for similar image data and proceeds to step S2401. On the other hand, when continuous photographing is not instructed, the CPU 107 proceeds to step S2309. In step S2309, the CPU 107 executes image retrieval on image data photographed last. Note that the CPU 107 may execute the image retrieval operation on all image data, which are continuously photographed, sequentially. Alternatively, the CPU 107 may select a part of the image data and execute image retrieval processing on the image data according to an operation instruction from the operating unit 110.

As explained above, according to this embodiment, the CPU 107 performs control to stop retrieval processing while the continuous photographing processing is instructed by the shutter button. Thus, it is possible to control the fall in continuous photographing performance.

Note that, since similar images are photographed continuously at the time of continuous photographing, it is useless to execute image retrieval processing on all the similar images. Therefore, it is possible to execute similar image retrieval efficiently by executing the image retrieval processing on only image data acquired last and selected image data.

4. Prioritization of Image Retrieval Objects

When a large amount of image data are stored in the storage medium 114, processing time for image retrieval increases. However, the necessity of executing image retrieval on all stored image data is not always high. For example, when plural similar image data are present, it seems that the data associated with the newer photographing time is closer to key image data than data associated with older photographing time. When a user desires to retrieve an image paying attention to image data that was photographed so long time ago that the user does not remember, it is advisable to perform retrieval in order from image data with an old photographing time.

When attention is paid to the amount of data of image data, it is considered that the image data is more likely to be similar to key image data as the amount of data is closer to the amount of the key image data. In addition, when attention is paid to photographing parameters, it is considered that image data is more similar to key image data as the photographing parameter of the image data are closer to the photographing parameters of the key image data.

In any case, it is possible to extract similar image data at a higher speed by determining priorities for plural image data to be retrieved in advance and executing image retrieval in accordance with the priorities than executing image retrieval in an arbitrary order.

Thus, in this embodiment, priorities are determined for image data to be retrieved in advance and image retrieval is executed in accordance with the priorities. In other words, image data are sorted on the basis of incidental information such as the photographing time, the amount of data, or the photographing parameters of the image data to be retrieved and image retrieval is executed in accordance with the order of a sorting operation based on this information.

Figure 25:
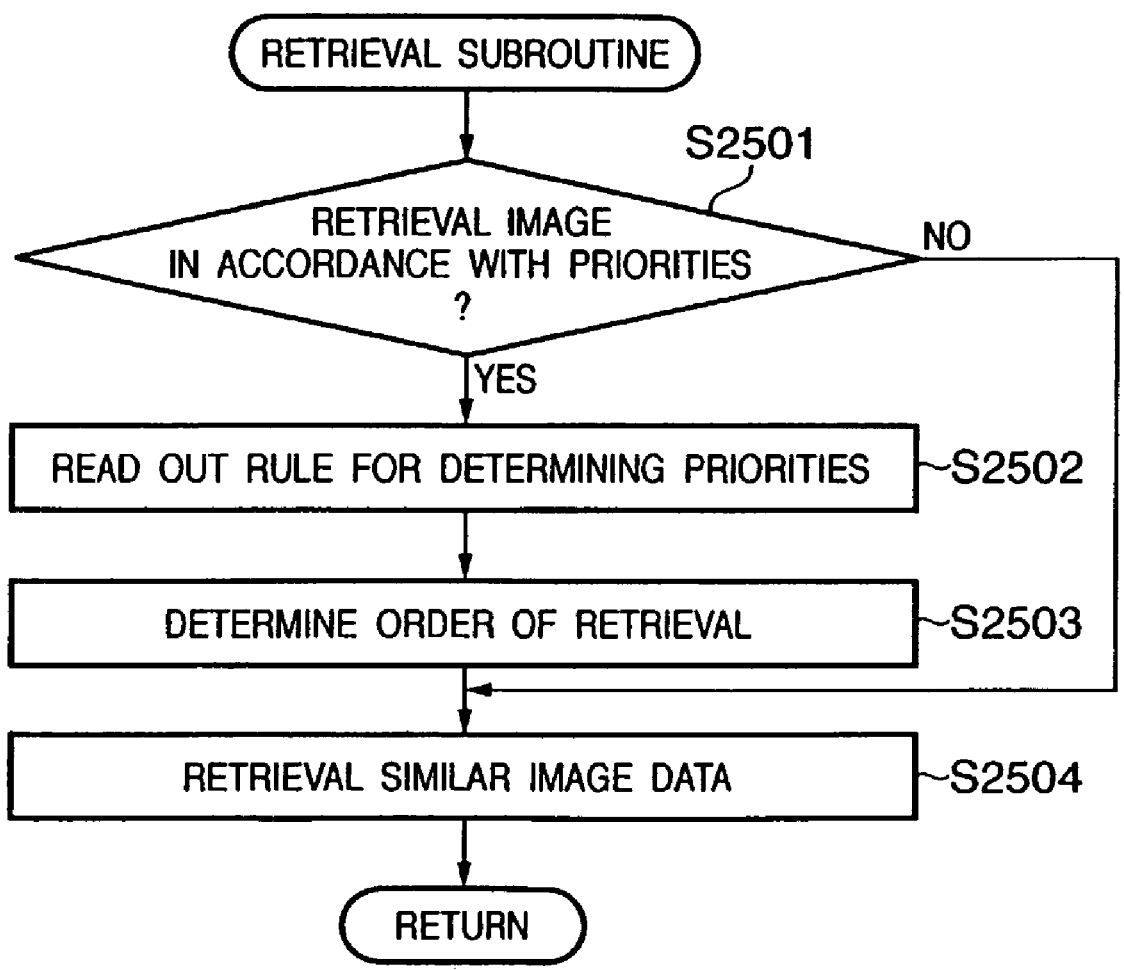
FIG. 25 is still another exemplary flowchart of the image retrieval processing according to the eighth embodiment.

FIG. 25 is an exemplary flowchart of image retrieval processing according to this embodiment. The flowchart is equivalent to the subroutine of steps S2104 and S2309.

In step S2501, the CPU 107 determines whether a setting is made such that image retrieval is executed in accordance with one or more priorities. When the image retrieval is executed in accordance with set priorities, the CPU 107 proceeds to step S2502. Otherwise, the CPU 107 proceeds to step S2504 and executes the image retrieval in an arbitrary order.

In step S2502, the CPU 107 reads out a rule for determining priorities from the ROM 113 or the storage medium 114. The rule is a rule for determining priorities for image data to be retrieved. Examples of such a rule include a rule for performing image retrieval in order of the time the photographing is performed, starting from the newest photographing time and ending on the oldest photographing time, in order of the time the photographing is performed, starting from the earliest photographing time and ending at the newest photographing time, or in order of the closeness to photographing time of key image data, a rule for performing image retrieval in order of the amount of data, starting with the image data having the largest amount of data and ending with image data having the smallest amount of data, in order of the amount of data starting with the image data having the smallest amount of data and ending with image data having the largest amount of data, or in order of the closeness to an amount of data of key image data, a rule for performing image retrieval in order of the largeness of photographing parameters, in order of the smallness of photographing parameters, or in order of the closeness to photographing parameters of key image data.

In step S2503, the CPU 107 determines priorities of respective image data in accordance with the read-out rule. It is assumed that, for example, the CPU 107 stores the determined priorities in the RAM 105 or the storage medium 114 in the form of a table.

In step S2504, the CPU 107 compares the image data with the key image data in order from the image data with a high priority and retrieves similar image data.

As explained above, according to this embodiment, image retrieval is executed in accordance with priorities. Thus, efficiency of the image retrieval processing is improved compared with the case in which image retrieval is executed in an arbitrary order.

In particular, in the case in which the CPU 107 stops image retrieval when it is instructed from the operating unit 110 to stop the image retrieval during the image retrieval, the effect of image retrieval according to priorities is large. According to the image retrieval according to priorities in this embodiment, similar image data desired by a user is found in an initial stage of the image retrieval at a high probability. Therefore, there is little meaning in executing image retrieval on all the image data. Consequently, it is possible to end image retrieval earlier while finding desired image data if the image retrieval can be interrupted in the middle. This provides the user with a larger advantage.

<Image Display Processing>

Figure 26:
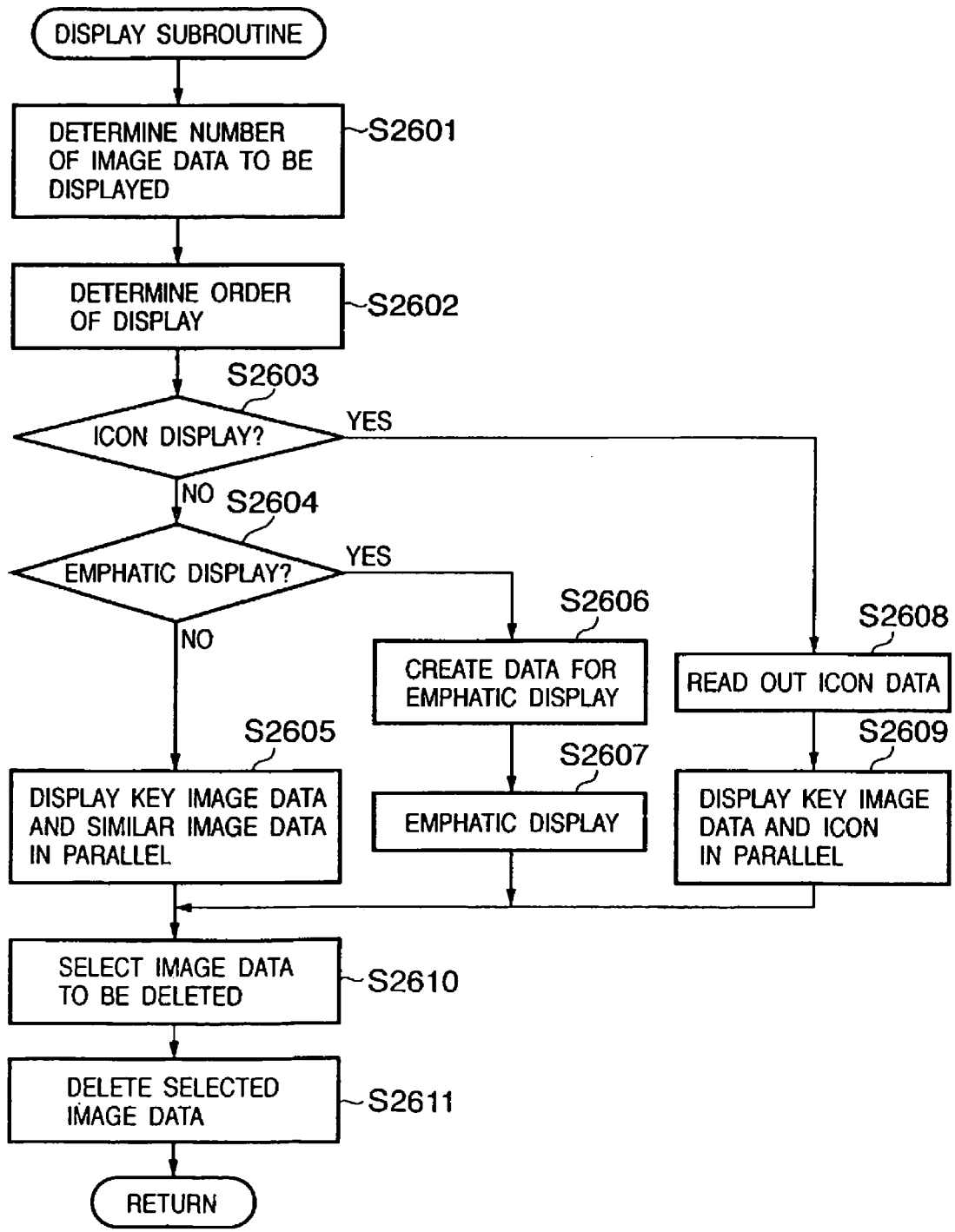
FIG. 26 is an exemplary flowchart concerning display processing for a retrieval result according to the eighth embodiment.

FIG. 26 is an exemplary flowchart concerning display processing for a retrieval result according to this embodiment. The flowchart is equivalent to the subroutine in steps S2105 and S2310.

In step S2601, the CPU 107 reads out data indicating the number of similar image data to be displayed at a time from the ROM 113. Note that it is assumed that the number of similar image data to be displayed at a time is set through the operating unit 110 in advance and stored in the ROM 113. For example, if the number of displayed images is reduced, since a display size of one similar image is increased, it is possible to perform a detailed comparison thereof. On the other hand, if the number of displayed images is increased, there is an effect that it is possible to evaluate a large number of similar images at a time while grasping the rough details of stored images. Note that, alternatively, the number may always take a fixed value. In that case, step S2601 is unnecessary.

In step S2602, the CPU 107 determines a display order of the retrieved image data. For example, the CPU 107 reads out a rule for determining the display order from the ROM 113 or the storage medium 114. The rule may be identical with the rule for determining priorities. Alternatively, the rule may be a rule that image data are displayed in descending order of similarity or ascending order of similarity. The CPU 107 determines the display order of the retrieved similar image data in accordance with the read-out rule. The display order is also stored in the RAM 105 and the like in the form of a table. Note that this step is also optional. Usually, the image data may be displayed in the order of retrieval.

In step S2603, the CPU 107 determines whether the display form of similar image data is set to icon display. It is assumed that information on whether the display form is set to icon display is inputted from the operating unit 110 in advance and stored in the ROM 113 or the like. When icon display is performed, the CPU 107 proceeds to step S2608. Otherwise, the CPU 107 proceeds to step S2604. Note that processing concerning the icon display is also optional.

In step S2604, the CPU 107 determines whether the display form of similar image data and key image data is set to emphatic display of a similar part. Information on whether a display form of similar image data and key image data is set to emphatic display is inputted from the operating unit 110 in advance and stored in the ROM 113 or the like. When emphatic display is performed, the CPU 107 proceeds to step S2606. Otherwise, the CPU 107 proceeds to step S2605.

In step S2605, the CPU 107 displays the key image data and the similar image data in parallel (e.g., FIG. 22).

In the case of the emphatic display, in step S2606, the CPU 107 creates data for emphatic display. For example, for the similar image data and the key image data, the CPU 107 may create image data with a part of the respective images (e.g., similar parts) enlarged. The CPU 107 may create data for displaying a part of the images (e.g., similar parts) by blinking. The CPU 107 may create data for displaying the images with a part of the images (e.g., similar parts) encircled with a line. Alternatively, the CPU 107 may create data for changing the color of a part of the images (e.g., similar parts). Note that, when the imaging apparatus 100 has plural emphatic display methods in advance, it is possible to perform emphatic display according to a preference of a user by allowing the user to select any one of the emphatic display methods from the operating unit 110 or the like. If the CPU 107 emphatically displays a part of the images that allows the user to determine a hand shake, a closed eye, a white void, and the like, this is useful in deleting an unnecessary image.

In step S2607, the CPU 107 causes the display unit 109 to execute emphatic display using the key image data, the similar image data, and the data for emphatic display.

Figure 27:
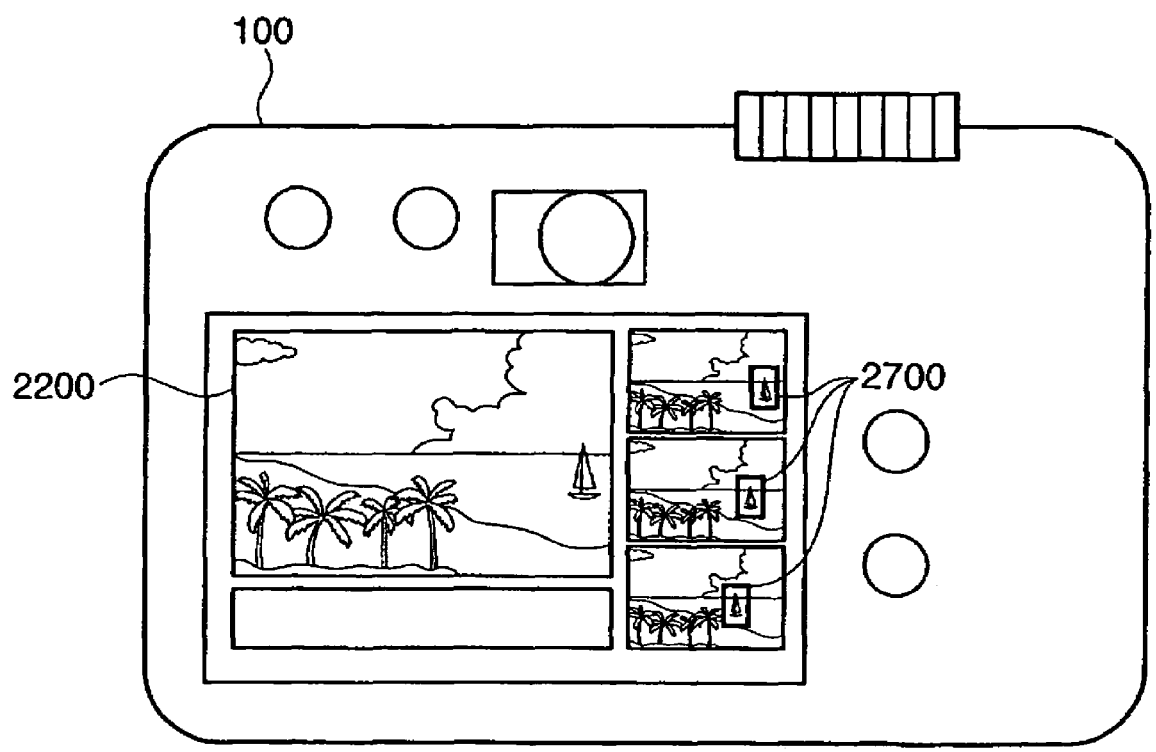
FIG. 27 is a diagram showing an example of display of a retrieval result according to the eighth embodiment.

FIG. 27 is a diagram showing an example of display of a retrieval result according to this embodiment. In this example, parts 2700 indicating a similar characteristic are encircled by lines to be emphatically displayed. Usually, since the display unit 109 provided in a digital camera is a liquid crystal display of several inches, it is difficult to evaluate plural images simultaneously on the display unit 109. Therefore, the evaluation is made easier by emphasizing a part of the images.

It is also possible that the user is notified of the presence of similar image data by displaying an icon instead of directly displaying the similar image data.

In step S2608, the CPU 107 reads out icon data corresponding to the similar image data from the ROM 113. As the icon, there are an icon indicting similarity and an icon indicating a similar characteristic. The similar image retrieving unit 112 or the CPU 107 determines the similarity and the similar characteristic on the basis of the key image data and the similar image data. The CPU 107 reads out icon data corresponding to the determined similarity and characteristic. The CPU 107 may create icon data every time instead of reading out icon data.

Concerning the similarity, for example, icons formed by digitizing similarity in several stages (e.g., five stages) or icons imitating alphabets representing similarity may be formed. Concerning the similar characteristic, icons imitating human faces may be formed when people on images are similar, icons imitating a mountain, a river, and the like may be formed when sceneries are similar, or icons indicating colors such as red and blue may be formed when color distributions are similar. In addition, concerning icons indicating the similar characteristic, character icons such as "person of Chinese character", "scenery of Chinese character", "color of Chinese character", and the like may be formed using one Chinese character corresponding to the similar characteristic.

In step S2609, the CPU 107 displays an icon corresponding to the similar image data together with the key image data.

Figure 28:
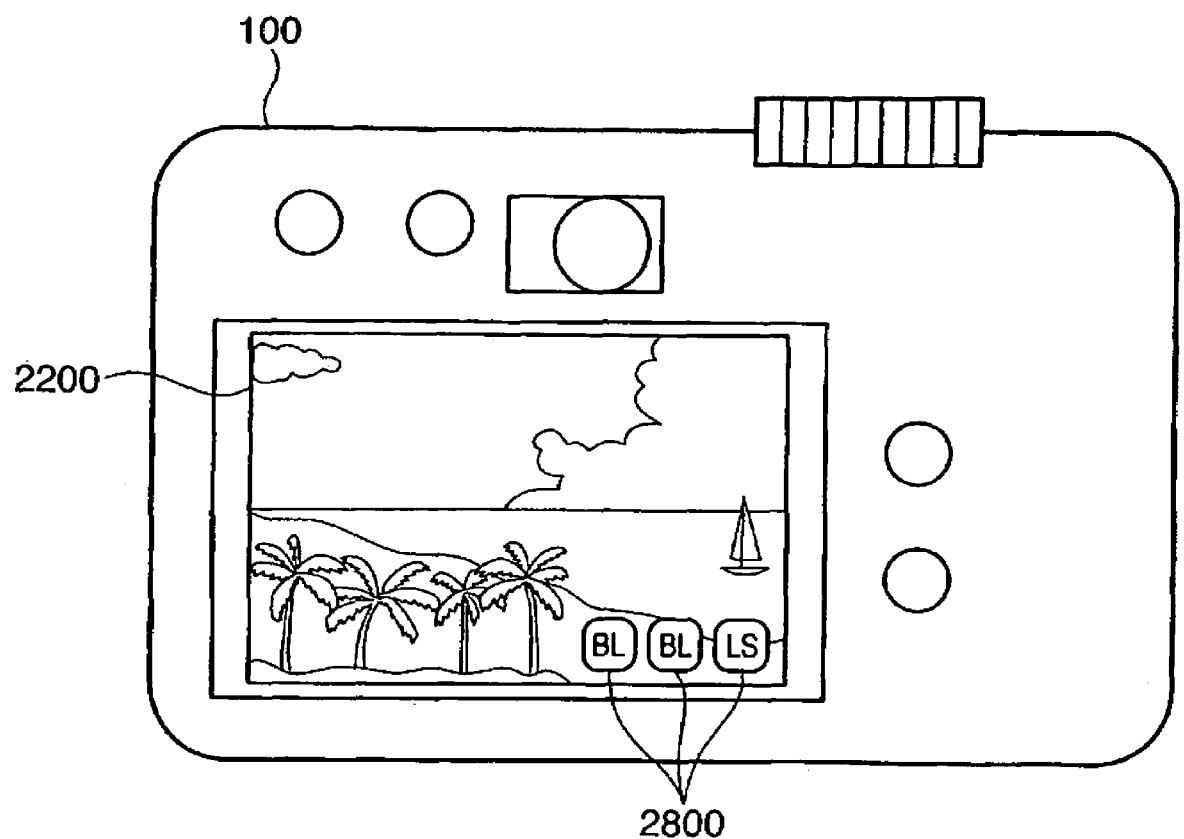
FIG. 28 is a diagram showing an example of display of icons according to the eighth embodiment.

FIG. 28 is a diagram showing an example of the display of icons according to this embodiment. In this example, a retrieval result of similar image data is displayed with character icons 2800 on key image data 2200. Even if the display unit 109 is small, it is possible to cause a user to recognize the presence of a similar image without preventing the display of a preview image or a photographed image by displaying the presence of similar image data and similar points thereof using icons.

In step S2610, the CPU 107 selects image data to be deleted according to a selection instruction from the operating unit 110.

In step S2611, the CPU 107 deletes the selected image data from the storage medium 114 or the RAM 105. Unnecessary images can be deleted easily by making it possible to delete any one of image data when the retrieval result is displayed on the display unit 109 in this way.

In an imaging apparatus such as a digital camera, since it is possible to perform photographing easily compared with a film camera, unnecessary images tend to be accumulated. For example, since a user can inspect an image immediately after photographing the image, if the user is dissatisfied with a photographing result, the user performs photographing again under similar conditions immediately. This also causes the accumulation of unnecessary images. In addition, if the user performs photographing when the user fails to remember that the user photographed a similar image before, similar image data are accumulated. If similar image data can be deleted appropriately in such a case, the user can sort out image data that the user owns.

As explained above, according to this embodiment, even in an imaging apparatus with an insufficient size of a display unit, it becomes easy to cause a user to recognize the presence of similar images by displaying icons.

In addition, since the emphatic display is used, it becomes easy to evaluate similar image data even in a digital camera with an insufficient size of a display unit.

Moreover, since photographed image data and similar image data thereof are displayed in parallel, a user can easily recognize and delete unnecessary data.

<Image Print Processing>

In this embodiment, retrieval processing for similar image data and display of a retrieval result are performed in the case of so-called direct print in which printing is performed by directly connecting an imaging apparatus and an image forming apparatus (e.g., a printer, a copying machine, a multifunctional product, etc.) without the intervention of a PC. It is needless to mention that the retrieval result may be printed by direct printing.

In printing image data, paper dedicated for photographs, which is different from print paper used for usual printing, is often used. The paper dedicated for photographs is more expensive than the usual print paper. Therefore, it is not only useless but also wasteful to print similar image data on many sheets. It is conceivable to reduce such waste by executing retrieval processing for similar image data before printing. In other words, it is possible to control the uselessness of executing print processing on similar image data on many sheets.

Figure 29:
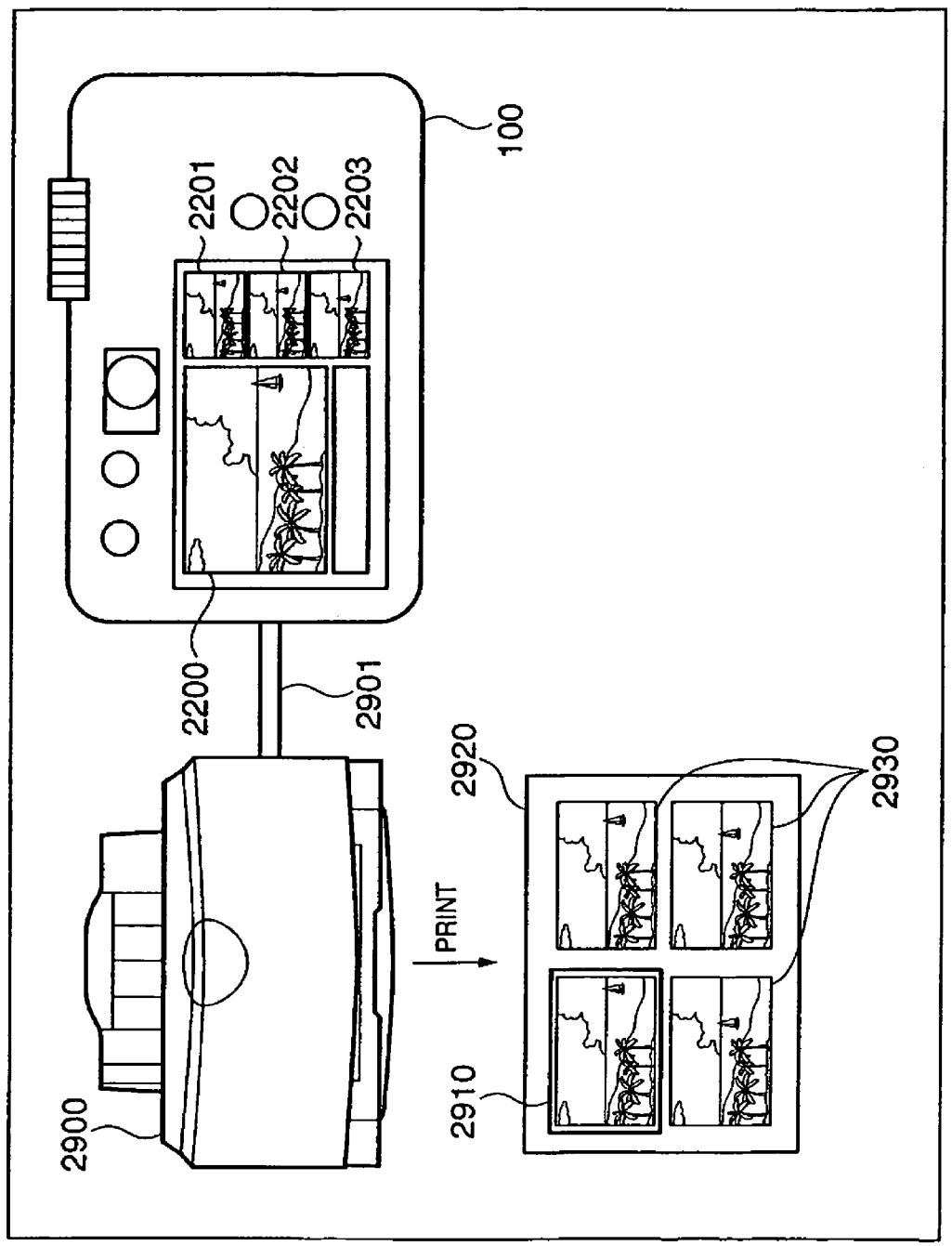
FIG. 29 is a diagram showing an example of a direct print system according to the eighth embodiment.

FIG. 29 is a diagram showing an example of a direct print system according to this embodiment. In this example, the communication unit 106 of the imaging apparatus 100 and a printer 2900 are connected by a connection cable 2901. As a connection system, for example, not only a wire system such as USB or IEEE1394, but also a wireless system such as Bluetooth, wireless LAN, or IrDA may be adopted. The communication unit 106 includes a communication circuit, a connector, and the like conforming to at least one of these systems.

Figure 30:
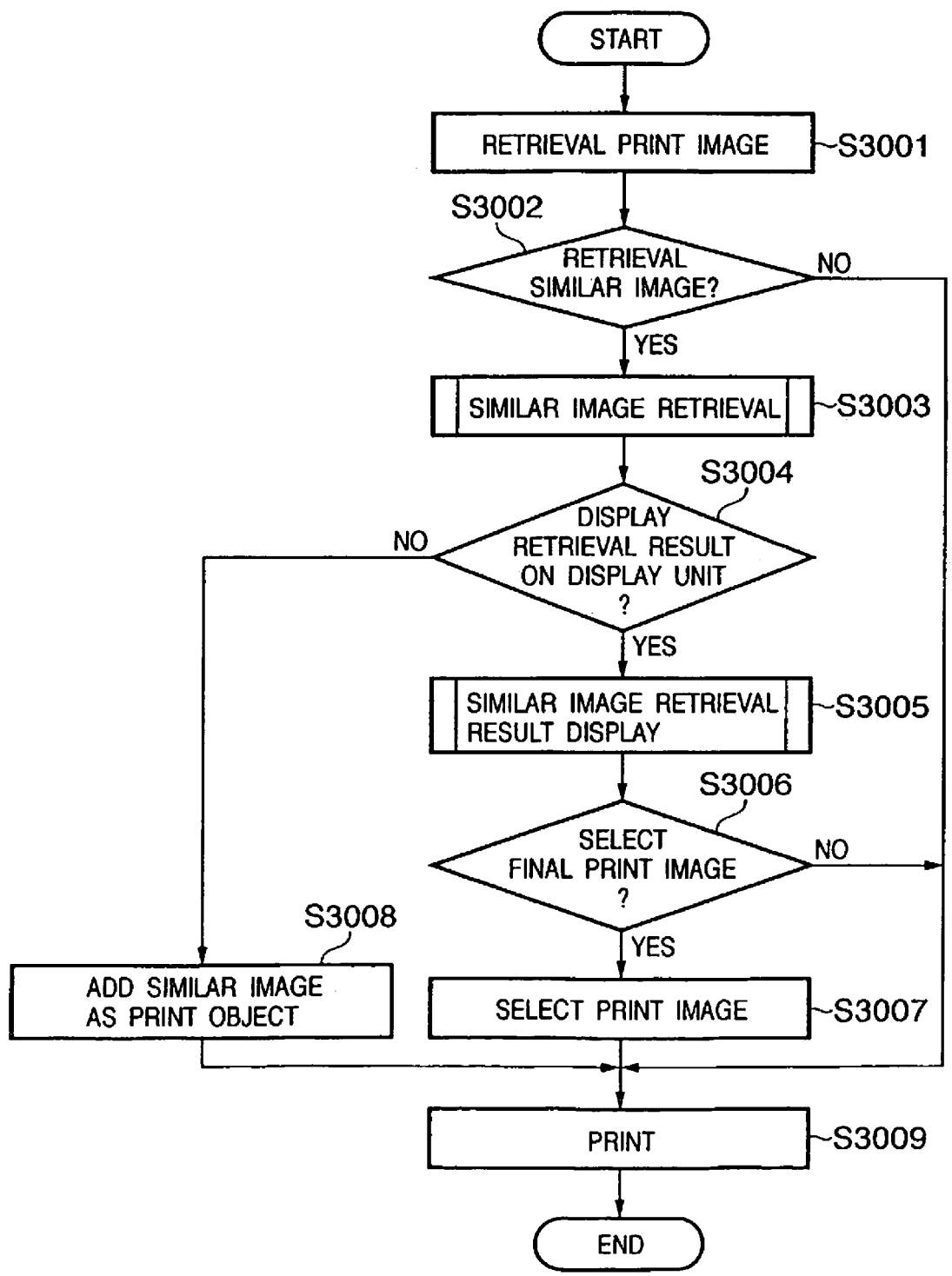
FIG. 30 is an exemplary flowchart of direct print processing according to the eighth embodiment.

FIG. 30 is an exemplary flowchart of direct print processing according to this embodiment. In this example, the imaging apparatus 100 and the printer 2900 are connected directly without the intervention of a PC. It is assumed that the print setting necessary for the direct print has already been executed.

In step S3001, the CPU 107 selects image data, which a user desires to print, according to a selection instruction from the operating unit 110.

In step S3002, the CPU 107 determines whether the setting is made such that retrieval for a similar image is executed at the time of the direct printing operation. Note that it is assumed that the CPU 107 stores setting information of the setting in the ROM 113 according to a setting instruction from the operating unit 110 in advance. For example, it is assumed that a user sets the setting information using a menu displayed on the display unit 109 and the operating unit 110. If the setting information is not set such that retrieval for similar image data is executed, the CPU 107 proceeds to step S3009 and transmits an instruction for printing selected image data (print job data) to the printer 2900 through the communication unit 106. On the other hand, if the setting information is set such that retrieval for similar image data is executed, the CPU 107 proceeds to step S3003.

In step S3003, the CPU 107 retrieves similar image data. A specific retrieval method is as explained in steps S2104 and S2309.

In step S3004, the CPU 107 determines whether the retrieved similar image data should be displayed on the display unit 109 or printed immediately without being displayed. Note that it is assumed that, through the operating unit 110, it is set in advance which processing should be selected in the same manner as the setting for the setting information explained in step S3002. Alternatively, the CPU 107 may display an inquiry message on the display unit 109 and determine whether the similar image data should be displayed or printed according to an operation instruction from the operating unit 110. When it is determined that the similar image data should be printed, the CPU 107 proceeds to step S3008 and adds the retrieved similar image data as a print object. On the other hand, when it is determined that the similar image data should be displayed, the CPU 107 proceeds to step S3005.

In step S3005, the CPU 107 displays the retrieved similar image data on the display unit 109. Specific display processing is as explained in steps S2105 and S2310.

In step S3006, the CPU 107 determines whether the setting is made such that image data, which is finally printed, is selected out of the key image data (in this example, the image data selected in step S3001) and the retrieved similar image data. It is assumed that contents of the setting are also set in advance as described above and the CPU 107 stores the contents in the ROM 113 as setting information. When setting is made such that a final print object is selected, the CPU 107 proceeds to step S3007. Otherwise, the CPU 107 proceeds to step S3009. Note that the CPU 107 may display an inquiry message on the display unit 109 and execute the judgment according to selection information from the operating unit 110.

In step S3007, the CPU 107 selects image data to be printed last out of the key image data (in this example, the image data selected in S3001) and the retrieved similar image data according to the selection instruction from the operating unit 110.

In step S3009, the CPU 107 executes print processing according to the direct printing on the selected image data.

In an example of printing of a retrieval result shown in FIG. 29, print object image data 2910 and similar image data 2930 similar to the print object image data 2910 are printed on a print medium 2920.

According to this embodiment, in the direct print, a user can search for image data similar to image data to be printed and check the image data. Therefore, for example, when similar image data has already been printed, the user can stop printing according to the user's own judgment. Thus, it is possible to control useless printing.

In general, a print medium is larger than the size of the display unit 109. Thus, if all of retrieved similar image data are printed or a part of the similar image data are selected and printed, since visibility is improved, the user can easily compare images.

In image retrieval, if the image retrieval according to priorities is used and a retrieval result thereof is printed by the direct print, it is possible to perform printing according to the user's desire for inspection.

The number of images to be printed on one storage medium may be instructed from the operating unit 110. For example, if the number of images to be printed is reduced, it is possible to compare similar images in detail. On the other hand, if the number of images is increased, it is possible not only to learn a rough tendency of similar images but also to reduce the number of storage medium required for printing. In particular, if images are printed thumbnail images, it is possible to determine an outline of similar images and the patterns of similarity at a time.

Steps S3002, S3004, and S3006 described above are optional. None of the steps may be adopted or one or more of the steps may be adopted.

Other Embodiments

The various embodiments have been described in detail. However, the invention may be applied to a system including plural apparatuses or may be applied to an apparatus consisting of one device.

Plural image retrieval processing operations and display processing and print processing for a retrieval result may be combined in any way. In other words, it is needless to mention that inventions corresponding to all combinations are disclosed herein.

In executing retrieval for a similar image, it is also possible that information on whether the retrieval is executed is stored in the ROM 113 as setting information in advance and the CPU 107 determines whether the retrieval should be executed on the basis of the setting information every time the retrieval is executed. It is possible to set the setting information from a menu displayed on the display unit 109 by operating the operating unit 110. Setting work is easier if the operating unit 110 includes a cross key or buttons.

The CPU 107 can stop retrieval processing for a similar image in the middle of retrieval according to an instruction from the operating unit 110. When the retrieval processing is stopped in the middle, the CPU 107 displays a retrieval result at that stage on the display unit 109. Note that retrieval at the time of direct printing may also be stopped in the middle.

If the retrieval processing for similar image data is executed when a panoramic image is created, it is possible to retrieve similar image data, from which panoramic image data can be formed, by connecting similar image data to photographed image data (key image data). In other words, the CPU 107 creates panoramic image data by connecting the photographed image data and the similar image data side by side or superimposing a part of the photographed image data on a part of the similar image data. Thus, a user can execute panoramic photographing without being conscious that the panoramic photographing is performed.

Instead of the method of displaying a retrieval result, the CPU 107 may create thumbnail image data of similar image data and display the thumbnail image data on the display unit 109. Since detailed information is not included in a thumbnail image, the thumbnail image is not preferable in terms of evaluation of a similar image but has an advantage that a retrieval result can be displayed at a high speed. Note that in the case of the direct printing, the CPU 107 may subject thumbnail image data to print processing.

In addition, a software program for realizing the respective functions of the embodiments (in this embodiment, programs corresponding to the flowcharts shown in FIGS. 4 to 9, FIGS. 13 to 17, FIG. 21, FIGS. 23 to 26, or FIG. 30) is supplied to a system or an apparatus directly or from a remote location. A computer included in the system or the apparatus reads out and executes a supplied program code. In this way, the invention is also attained.

Therefore, the program code itself installed in the computer in order to realize the functions and the processing of the invention also realizes the invention. In other words, the computer program itself for realizing the functions and processing is a part of the invention.

In that case, the program may take any form such as an object code, a program executed by an interpreter, and script data supplied to an OS as long as the program has a function as a program.

As storage medium for supplying the program, for example, there are a flexible disk, a hard disk, an optical disk, a magneto-optical disk, a CD-ROM, a CD-R, a CD-RW, a magnetic tape, a nonvolatile memory card, a ROM, and a DVD (a DVD-ROM, a DVD-R).

As a method of supplying the program, it is possible to supply the program by making connection to a web page on the Internet using a browser of a client computer and downloading a computer program itself of the invention or a file, which is compressed and includes an automatic install function, to a storage medium such as a hard disk from the web page. In addition, it is also possible to realize the invention by dividing a program code forming the program of the invention into plural files and downloading the respective files from different web pages. In other words, a WWW server, which causes plural users to download a program file for realizing the functional processing of the invention with a computer, may be an element of the invention.

The program of the invention is encrypted and stored in a storage medium such as a CD-ROM and distributed to users. A user meeting predetermined conditions is allowed to download key information for decryption from a web page through the Internet. The user executes the encrypted program using the key information and installs the program in a computer. It is also possible to realize the invention in this way.

The computer executes a read-out program, whereby the functions of the embodiments are realized. In addition, an OS or the like running on the computer performs a part or all of actual processings. The functions of the embodiments can be realized by these processing operations.

A program read out from the storage medium is written in memory provided in a function extended board inserted in the computer or a function extended unit connected to the computer. Then, a CPU or the like provided in the function extended board or the function extended unit performs a part or all of actual processing operations on the basis of an instruction of the program. The functions of the embodiments are also realized by such processing operations.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-173010 filed on Jun. 10, 2004 and 2004-173013 filed on Jun. 10, 2004, the entire contents of which are hereby incorporated by reference herein.

The invention claimed is:

1. A digital camera operable in an imaging mode and a reproduction mode, comprising:
   a capturing unit that captures a subject image;
   a storing unit that stores the subject image captured by said capturing unit on a storage medium;
   a retrieving unit that performs a retrieval operation of an image from the subject image stored on the storage medium;
   a plurality of input elements by which a user inputs instructions to said digital camera; and
   a user-operable mode setting unit setting one of the imaging mode and the reproduction mode,
   wherein when the mode setting unit sets the imaging mode, said capturing unit sets the subject image as a generic image to be retrieved or a key image to be used as a retrieval key for a retrieval operation, depending on the instructions received from the user operating at least one of the input elements, and
   wherein when said mode setting unit sets the reproduction mode:
      the results of the retrieval operation performed in the imaging mode are automatically displayed on a display unit;
      a key-image capture operation is performed with said capturing unit in response instructions received from the user operating at least one of the input elements, and a new retrieval operation is performed with said retrieval unit in response to instructions received from the user operating at least one of the input elements; and
      a key-image-selection operation is performed with said retrieval unit in response instructions received from the user operating at least one of the input elements, so that key images stored in said storing unit are displayed on the display unit and a user can select one of the displayed images as a new key image by the user operating at least one of the input elements.

2. The digital camera according to claim 1, wherein said input elements include a shutter button and a retrieval button, and wherein in the imaging mode after said capturing unit captures the key image captured in response to pressing of the shutter button and a retrieval button simultaneously, said retrieving unit starts the retrieval operation using the key image.

3. The digital camera according to claim 1, wherein, after said capturing unit captures the key image in the reproduction mode, said retrieving unit starts the retrieval operation using the key image.

4. The digital camera according to claim 1, wherein said storing unit stores the generic image to be retrieved in the storage medium and stores the key image to be used as a retrieval key of a retrieval operation on the identical storage medium.

5. The digital camera according to claim 4, wherein a storing area for the generic image and a storing area for the key image in the storage medium are separated.

6. The digital camera according to claim 4, wherein information different from file management information for the generic image is attached to file management information for the key image.

7. The digital camera according to claim 4, wherein, in storing the key image in the storage medium, the key image is stored after compression or curtailment of imaged subject image is performed.

8. The digital camera according to claim 4, wherein the key image stored in the storage medium is copied, changed, or linked to the generic image.

9. The digital camera according to claim 1, wherein at least one of the input elements permits a user to designate an image as the key image or an image appearing from a retrieval result and one of the input elements comprises a retrieval button, which when pressed by the user causes said retrieving unit to execute a retrieval operation again with the designated image as a key image.

10. The digital camera according to claim 1, wherein said retrieving unit searches for a generic image similar to the key image from the storage medium.

11. The digital camera according to claim 1, further comprising a display unit which displays an image, wherein the display unit displays images retrieved by the retrieving unit when the mode setting unit sets the imaging mode.

12. The digital camera according to claim 11, wherein the display unit displays the images retrieved the retrieving unit in response the mode setting unit switching from the imaging mode to the reproduction mode.

* * * * *